US011751611B2

(12) United States Patent
Jost et al.

(10) Patent No.: US 11,751,611 B2
(45) Date of Patent: Sep. 12, 2023

(54) KNITTED ELECTROCHEMICAL CAPACITORS AND HEATED FABRICS

(71) Applicant: Drexel University, Philadelphia, PA (US)

(72) Inventors: Kristy Jost, Philadelphia, PA (US); Yury Gogotsi, Warminster, PA (US); Genevieve Dion, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 183 days.

(21) Appl. No.: 16/927,747

(22) Filed: Jul. 13, 2020

(65) Prior Publication Data
US 2021/0112891 A1 Apr. 22, 2021

Related U.S. Application Data

(63) Continuation of application No. 14/906,915, filed as application No. PCT/US2014/048197 on Jul. 25, 2014, now abandoned.

(Continued)

(51) Int. Cl.
*A41D 13/05* (2006.01)
*A41D 13/005* (2006.01)
(Continued)

(52) U.S. Cl.
CPC ......... *A41D 13/0051* (2013.01); *A41D 31/00* (2013.01); *H01G 11/24* (2013.01);
(Continued)

(58) Field of Classification Search
CPC .... A41D 13/0051; A41D 31/00; H01G 11/24; H01G 11/28; H01G 11/70; Y02E 60/13
(Continued)

(56) References Cited

U.S. PATENT DOCUMENTS 2,670,620 A 3/1954 Henry
4,590,122 A 5/1986 Levin
(Continued)

FOREIGN PATENT DOCUMENTS

WO 2004/090212 A1 10/2004

OTHER PUBLICATIONS

Jost et al., "Textile Energy Storage in Perspective," Journal of Materials Chemistry A, The Royal Society of Chemistry, Feb. 20, 2014.
(Continued)

*Primary Examiner* — Sang Y Paik
(74) *Attorney, Agent, or Firm* — BakerHostetler

(57) ABSTRACT

A garment includes a supercapacitor and/or heated fabrics including a first conductive yarn knitted to as to form a current collector and a second conductive yarn knitted to as to form an electrode that is in electrical contact with the current collector. The conductive yarns are knitted into a predetermined supercapacitor design having respective electrodes that are not in electrical contact with each other. An electrolyte saturates at least the electrode material either before or after knitting, and an ionically permeable electronic separator allows the electrodes to be in close proximity to each other without being in electrical contact with each other. A heating element may also be formed by knitting at least one of the first and second conductive yarns into a linear resistor or by knitting an insulated conductive yarn into a sheet of fabric. Such a heating element is connected to the supercapacitor via a switch.

18 Claims, 29 Drawing Sheets

Related U.S. Application Data

(60) Provisional application No. 61/858,358, filed on Jul. 25, 2013.

(51) Int. Cl.
  *H01G 11/24* (2013.01)
  *H01G 11/70* (2013.01)
  *H01G 11/28* (2013.01)
  *A41D 31/00* (2019.01)

(52) U.S. Cl.
  CPC ............. *H01G 11/28* (2013.01); *H01G 11/70* (2013.01); *Y02E 60/13* (2013.01)

(58) Field of Classification Search
  USPC .................... 219/211, 212, 527–529, 549
  See application file for complete search history.

(56) References Cited

U.S. PATENT DOCUMENTS

| | | | |
|---|---|---|---|
| 5,484,983 A * | 1/1996 | Roell | D04B 1/12 |
| | | | 219/545 |
| 5,587,872 A * | 12/1996 | Lian | H01M 14/00 |
| | | | 29/25.03 |
| 6,080,690 A | 6/2000 | Lebby et al. | |
| 7,038,177 B2 | 5/2006 | Rock | |
| 8,693,166 B2 | 4/2014 | Kondou et al. | |
| 2003/0003359 A1 | 1/2003 | Banno et al. | |
| 2003/0112580 A1 * | 6/2003 | Reynolds, III | H01G 11/70 |
| | | | 361/502 |
| 2005/0016220 A1 * | 1/2005 | Okuno | D04B 7/26 |
| | | | 66/64 |
| 2008/0287022 A1 | 11/2008 | Dhawan et al. | |
| 2009/0018428 A1 | 1/2009 | Dias et al. | |
| 2009/0311587 A1 | 12/2009 | Best et al. | |
| 2010/0259866 A1 * | 10/2010 | Shaffer | H01G 11/26 |
| | | | 29/25.03 |
| 2011/0304964 A1 | 12/2011 | Fleischer et al. | |
| 2012/0171575 A1 | 7/2012 | Wee et al. | |
| 2012/0224247 A1 | 9/2012 | Sotzing et al. | |

OTHER PUBLICATIONS

Jost, et al., "Carbon Coated Textiles for Flexible Energy Storage", Energy and Environmental, Sciences, Oct. 2011, vol. 4, 5060-5067.
Jost, et al., "Knitted and screen printed carbon-fiber supercapacitors for applications in wearable electronics," Energ Environ Sci, Jun. 19, 2013, vol. 6, 8 pgs.

* cited by examiner

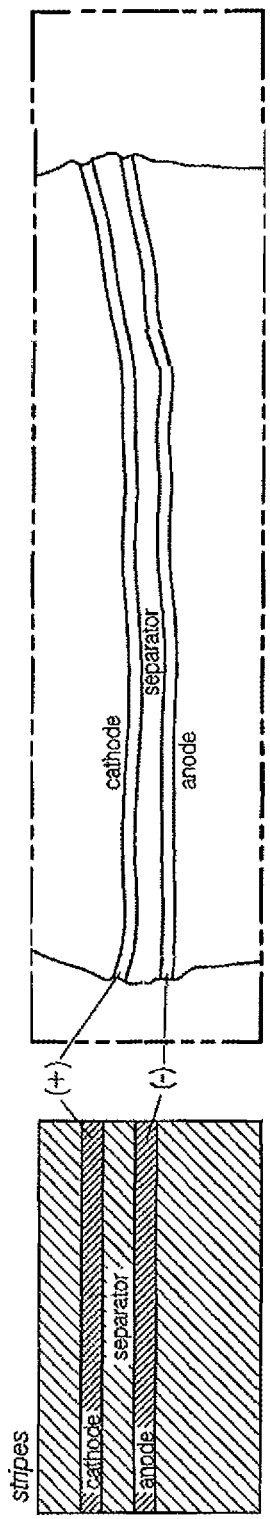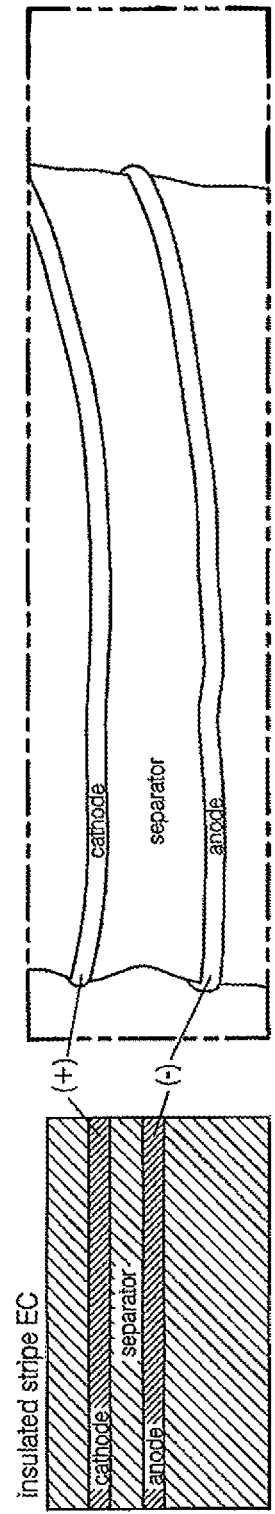
FIG. 8A  FIG. 8B  FIG. 8C  FIG. 8D

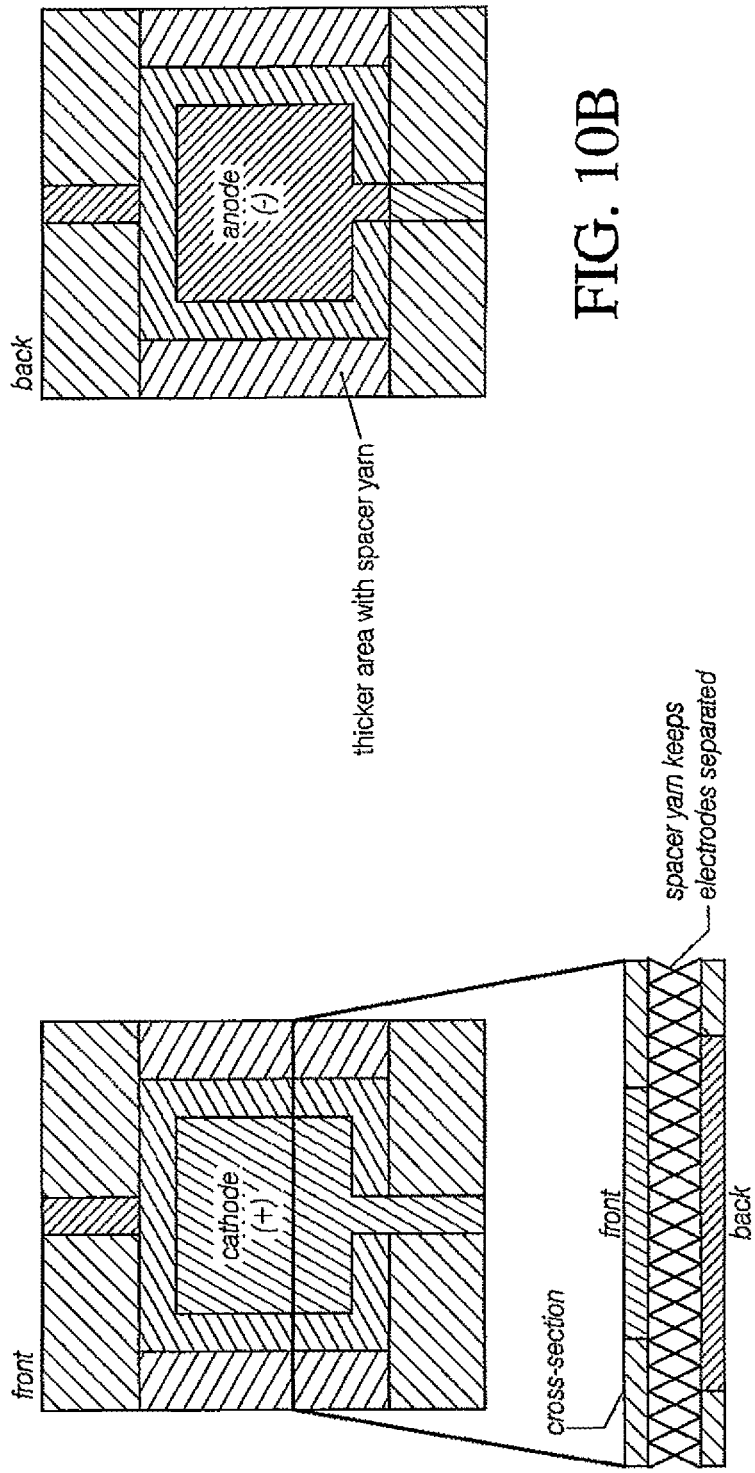

KNITTED ELECTROCHEMICAL CAPACITORS AND HEATED FABRICS

CROSS REFERENCE TO RELATED APPLICATION

This application is a continuation of U.S. application Ser. No. 14/906,915, filed Jan. 22, 2016, which is a National Stage Application filed under 35 U.S.C. 371 of International Application No. PCT/US2014/048197, filed Jul. 25, 2014, which claims benefit of Provisional Application No. 61/858,358, filed Jul. 25, 2013, which are each hereby incorporated by reference in their entirety for any and all purposes.

TECHNICAL FIELD

The invention relates to smart knitted fabrics and the use of such fabrics to create capacitors and heating elements in fabrics.

BACKGROUND

Numerous researchers have attempted to develop conductive threads and so-called "smart fabrics." Devices including garments made from smart fabrics are expected to make an enormous contribution to health care by increasing patient safety and comfort and replacing bulky medical instrumentation to measure patient data. These types of devices are also expected to be use in a wide variety of sensing, communication, and tactile interaction applications. In conventional smart fabrics, sensors are being widely studied and used as an essential component, especially in the fields of medical and athletic applications. Such wearable sensors provide a means to monitor the wearer's health through physiological measurements in a natural setting or can be used to detect or alert care providers to potential hazards around the wearer. However, to date, such garments have generally incorporated sewn-in sensors and generally have not been adaptable enough in design to create the variety of shapes and sizes needed for most useful applications.

The field of wearable electronics has shown great potential with applications in healthcare, the military and everyday consumption as wearable heart rate monitors, heating/cooling garments, and other wearable devices that can relay real time information on a patient's or soldier's vitals wirelessly. However, many of these electronic devices require a power source, and textile energy storage remains an underdeveloped cornerstone to the field as conventional batteries and capacitors are still used in devices like the Nike Fit, Adidas MiCoach, Cute-circuit Galaxy Dress, T-shirtOS, "Hi-call" Bluetooth enabled phone glove, Google Glass, Apple Smart Watch, and UnderArmor heart rate monitors. Though research has reported efforts to store energy in textiles (see, for example, the state of the art report provided in Jost et al., "Textile Energy Storage in Perspective," Journal of Materials Chemistry A, The Royal Society of Chemistry, Feb. 20, 2014), devices suitable for large-scale manufacturing have not yet been reported. It is desired to develop an energy storage device that is formed from textile materials suitable for large-scale manufacturing.

Heated clothing has also found many applications for people who live and work in cold climates. Some examples include Columbia Sportswear Company's heated jackets and Gerbing's heated gloves. These garments/accessories are often comprised of multiple layers of thick fabrics, and batteries to power the heating elements are sandwiched between these layers. It is also desired to develop energy storage devices and heating elements for use in such heated clothing.

The present invention addresses these and other needs in the art.

SUMMARY

The invention addresses the above-mentioned needs in the art by providing techniques for the fabrication of a knitted supercapacitor as a possible power source and for the fabrication of heating elements for wearable electronic devices.

In example embodiments, a knitted garment is provided including a supercapacitor and/or heated fabrics. The garment includes a first conductive yarn knitted to form a current collector and a second conductive yarn knitted to form an electrode that is in electrical contact with the current collector. The conductive yarns are knitted into a predetermined supercapacitor design having respective electrodes that are not in electrical contact with each other. An electrolyte saturates at least the electrode material either before or after knitting, and an ionically permeable electronic separator is provided that allows the electrodes to be in close proximity to each other without being in electrical contact with each other. A heating element may also be formed by knitting at least one of the first and second conductive yarns into a linear resistor or by knitting an insulated conductive yarn into a sheet of fabric. Such a heating element is connected to the supercapacitor via a switch.

Other example embodiments include methods for creating such garments from conductive fibers. For example, a sample method includes the steps of creating a garment including a supercapacitor and/or heated fabrics by forming a current collector from a first conductive yarn, forming an electrode from a second conductive yarn that is in electrical contact with the current collector, knitting the first and second conductive yarns into a predetermined supercapacitor design having respective electrodes that are not in electrical contact with each other, saturating at least the electrode material with an electrolyte either before or after knitting the supercapacitor, and providing an ionically permeable electronic separator that allows the electrodes to be in close proximity to each other without being in electrical contact with each other. The method may further include the step of forming a heating element by knitting at least one of the first and second conductive yarns into a linear resistor or by knitting an insulated conductive yarn into a sheet of fabric. The resulting heating element is connected to the supercapacitor via a switch.

BRIEF DESCRIPTION OF THE DRAWINGS

The foregoing and other beneficial features and advantages of the invention will become apparent from the following detailed description in connection with the attached figures, of which:

FIG. 8A illustrates stripe electrochemical capacitor (EC) geometry.

FIG. 8B illustrates knitted stripe EC in stainless steel yarn.

FIG. 8C illustrates insulated stripe EC geometry.

FIG. 8D illustrates insulated stripe EC knitted in stainless steel yarn.

FIG. 10A illustrates a spacer EC front a showing cathode and a cross-sectional illustration of spacer yarn acting as an electrical insulator between two electrodes.

FIG. 10B illustrates a spacer EC back with anode.

DETAILED DESCRIPTION OF ILLUSTRATIVE EMBODIMENTS

Figure 1B:
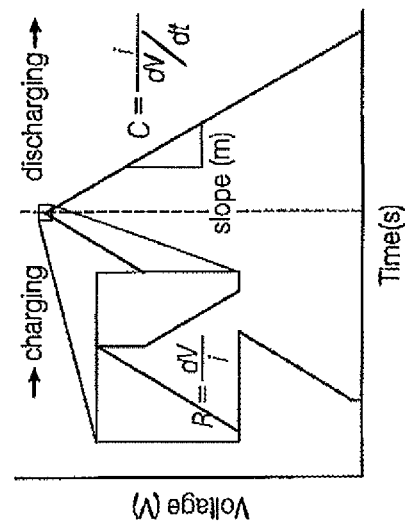
FIG. 1B illustrates an example galvanostatic cycling curve.

The present invention may be understood more readily by reference to the following detailed description taken in connection with the accompanying figures and examples, which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer both to methods and software for implementing such methods.

A detailed description of illustrative embodiments of the present invention will now be described with reference to the figures. Although this description provides a detailed example of possible implementations of the present invention, it should be noted that these details are intended to be exemplary and in no way delimit the scope of the invention.

The invention incorporates knit designs for embedding supercapacitor components into 2D and 3D intarsia knitted fabrics and for knitting heated fabrics as single or double layer textiles with other electrical components (e.g., wiring or energy storage) embedded within the same sheet of fabric during manufacturing. Embodiments of knitted electrochemical capacitors (ECs) and heated fabrics powered by same will be described below.

Knitted Electrochemical Capacitor (EC)

In a sample embodiment, the invention incorporates designs for embedding all supercapacitor components into intarsia knitted fabrics (i.e., insertion of other segments of yarn into the fabric to form patterns like polka dots or stripes). A supercapacitor, also known as a double layer capacitor, stores electrical energy in a double layer charge between a high surface area carbon electrode and its respectively charged counter ions in an electrolyte solution. Typically, the more surface area available in the electrode material, means more ions can adsorb to the surface, resulting in more energy being stored. The fabrication processes and designs described herein allow the integration of multiple supercapacitors in series or parallel to increase the voltage or current that is specific to an application. Different geometries have been fabricated as examples of the different kinds of 2D and 3D fabrics capable of storing energy and engineered to satisfy different size, material, resistance and energy density specifications. Importantly, these geometries, though intended for supercapacitors, may also be used for fabric batteries, where the geometries would remain the same, but the materials could be changed, (e.g., lithium ion battery would require a graphite yarn, Lithium cobalt oxide embedded yarn, and a PVA-LiPF6 gel electrolyte). Similarly, solar cells, triboelectric generators, diodes, and other electronic devices have the same two electrode geometry. The disclosed method for integration into textiles allows for many kinds of new electronics to be fabricated quickly and easily.

Experimental/Fabrication Description

Figure 1A:
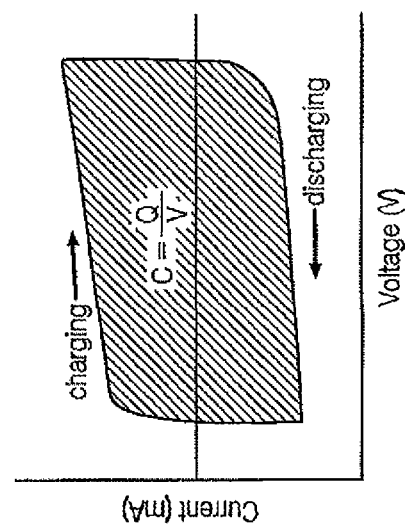
FIG. 1A illustrates an example of a cyclic voltammogram.
Figure 1C:
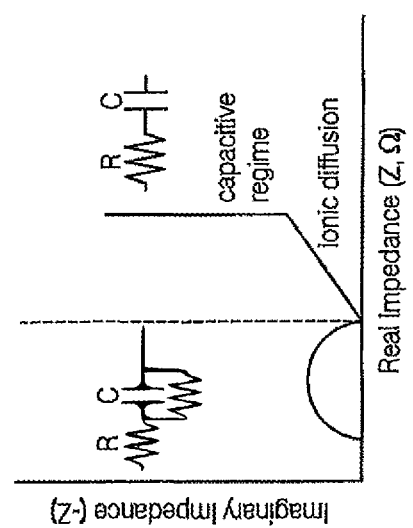
FIG. 1C illustrates an example of a PEIS curve for a supercapacitor.

FIGS. 1A-C illustrate typical electrochemical techniques and results for supercapacitors. FIG. 1A provides an example of a cyclic voltammogram, of which the area under the curve is equivalent to the charge stored (C=Q/V). FIG. 1B provides an example of galvanostatic cycling curve, where the capacitance is equivalent to the constant current divided by the slope of the discharge curve, where the inset shows the IR drop (R=dV/i). FIG. 1C provides an example of a PEIS curve for a supercapacitor having a slanted slope at the beginning of the curve, indicative of ionic diffusion before becoming primarily capacitive. The right side hump shows a resistor in series with an RC circuit, the slanted part of the curve indicates ionic diffusion, and the upright vertical curve is representative of a perfect capacitor.

ECs, also called double layer capacitors, store charge by adsorbing electrolyte ions to oppositely charged electrode surfaces. Each supercapacitor has an anode and a cathode, charged negatively and positively, respectively. The more surface area that is available means that there are more sites for ion adsorption, and more charge can be stored. Therefore, the energy stored is proportional to the available surface area in the electrode materials. The material requirements for the devices to operate will be described in the materials section below.

How to quantify the energy stored:

Helmholtz described capacitance for a parallel plate capacitor with a dielectric between two metal plates as being proportional to the dielectric constant of the separating material (c), multiplied by the surface area of the plates (A) divided by the distance (d) between them (Eq. 1):

$$C = \frac{\varepsilon A}{d}. \quad \text{Eq. 1}$$

When compared to supercapacitors, the area of the plates can be increased by using a high surface area material allowing for more sites for ions to adsorb. The distance (d) between the plates is now on the order of a few angstroms, being the distance between the ion and the surface of the electrode material. Thus, if one knows how much active material comprises the electrodes, and the active ionic species, its charge, and solvated radius, then the theoretical capacitance can be determined. However, other factors such as diffusion of ions into the electrode material and their mobility in solvent can greatly affect the capacitance. Thus, Eq. 1 can give one a general understanding of what capacitance one can expect to see from a given material, but determining capacitance experimentally (FIGS. 1A-C) is much more common, and leads to greater insights into the material system.

Typically, bulk carbon films for supercapacitors have different capacitances per gram of the active material. Activated carbons have capacitances of 100 F/g, CNTs are usually lower around 50 F/g, carbon anions are usually 20-30 F/g, and graphene can be anywhere from 20 F/g up to 240 F/g depending on how it is processed. Graphene's theoretical gravimetric capacitance has been reported to be 520 F/g; however, this has never been achieved. Usually metals and ceramics have gravimetric capacitances on the order of <1 F/g to 5 F/g, which are much lower, but are used more commonly for circuit components that require rapid charge and discharge. The gravimetric capacitance is typically reported for the active mass of one electrode. The electrode capacitance for symmetric double layer capacitors is always twice that of the device capacitance, given that the electrodes are treated as two capacitors in series, which gives one the relationship expressed in Eq. 2. If one assumes the electrodes are of equal capacitance, then one can also derive the expression in Eq. 3, where $C_e$ is the electrode capacitance and $C_d$ is the device capacitance.

$$\frac{1}{C_e} + \frac{1}{C_e} = \frac{1}{C_d} \quad \text{Eq. 2}$$

$$C_d = \frac{C_e}{2} \quad \text{Eq. 3}$$

Typical materials used in commercially available supercapacitors include activated carbons (1200 m2/g to 2000 m2/g), carbon anions (~500 m2/g), carbon nanotubes (200-800 m2/g), and graphene, which spans the spectrum up to a theoretical specific surface area of 2630 m2/g. Many yarns, including carbon fiber yarns, have 50-200 m2/g of specific surface area depending on the fineness of the fibers, meaning by comparison they will store less energy, but are adaptable for textile applications. If, for example, a yarn comprised one of these high surface area carbon materials, one could potentially store as much energy as a conventional supercapacitor per device weight, volume and area. Therefore, it will be appreciated that knitted ECs can be made of yarns comprised entirely or partly of these high surface area conductive materials.

Electrochemical Capacitor Components and Material Requirements:

In an example embodiment, the electrode material (E) comes in the form of a yarn and consists of any high surface area, relatively conductive material. As reported in Jost, et al., "Knitted and screen printed carbon-fiber supercapacitors for applications in wearable electronics," Energ Environ Sci, Vol. 6, DOI:10.1039/C1033EE40515J, DOI:10.1039/C3EE40515J (2013), it is possible to use commercially available carbon fiber yarn to act as an electrode material or current collector in a supercapacitor. For example, activated carbon (YP17, Kuraray Japan, 1500 M²/g, made from coconut shells) embedded in a 2-ply yarn may be used. It is also possible to use an electrode material that is conductive enough to act as both the current collector and electrode material, the only concern being that more graphitized carbon has a lower specific surface area, ultimately resulting in materials with lower capacitances. Only inert conductive materials can be used in these devices, i.e., materials that will not undergo redox or other electrochemical reactions when assembled into a capacitor to store energy. If redox does occur, the electrode material will be degraded over time, and the capacitor will not have a long life. Redox materials are ideal for batteries, for which these geometries can also be used.

Suitable commercially available conductive yarn materials include but are not limited to:
Carbon fiber yarn, Pharr Yarns, USA
Stainless steel yarn, Beakart, Inc., Germany
Graphite yarn, SGL Group
Carbon nanotube yarn, Nanocomp
Copper coated yarn
Activated carbon, Kuraray Japan In an example embodiment, the current collector (CC) is a highly conductive yarn that is in good electrical contact with the electrode yarn, either by 1) knitting the CC alongside the electrode (E) in an intertwining knit structure; 2) feeding both yarns into the knitting machine together to be knitted as if they were a single yarn, also known as plating; 3) plying the CC and E together using the same techniques traditionally used to ply strings and yarns; or 4) integrating the CC into the E material, meaning one yarn holds both the electrode and collector components. Typically, the same material is used in each CC to avoid producing a galvanic current, which may result in completely dissolving one CC into the electrolyte solution due to oxidation. Different CC materials may be suitable for battery applications. The same commercially available conductive yarn materials as noted above also may be used.

Figure 2A:
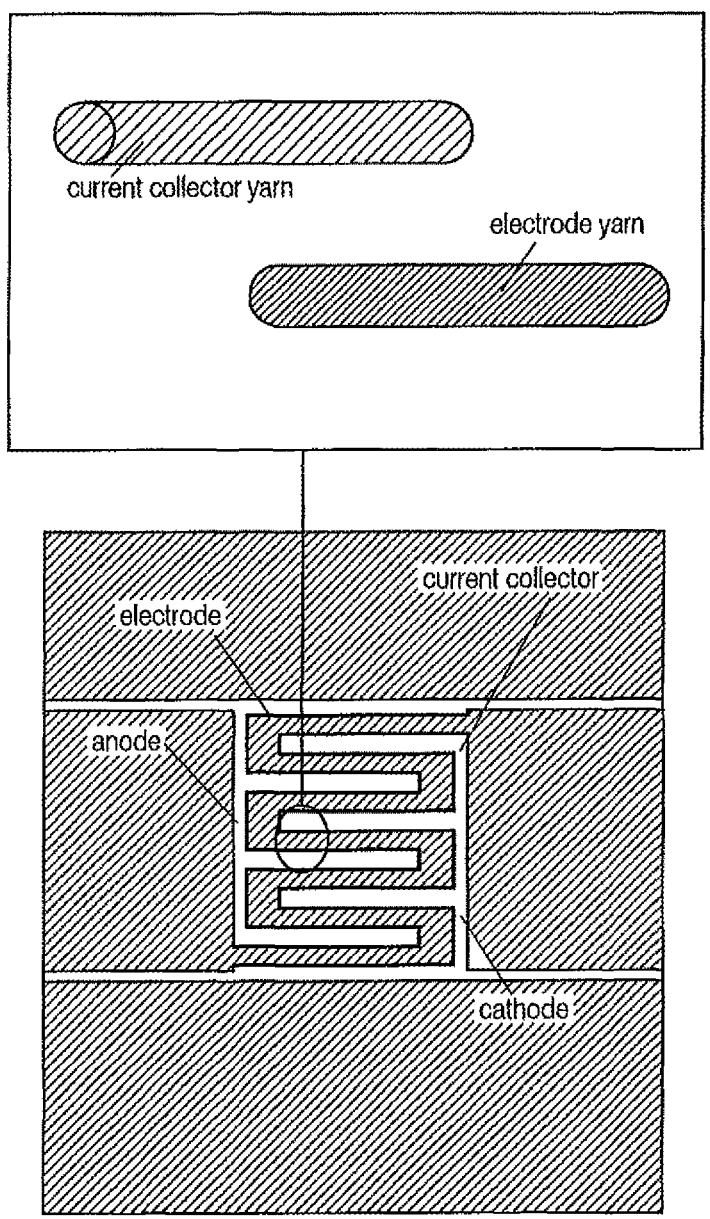
FIG. 2A illustrates an example using two separate electrode and current collecting yarns.
Figure 2B:
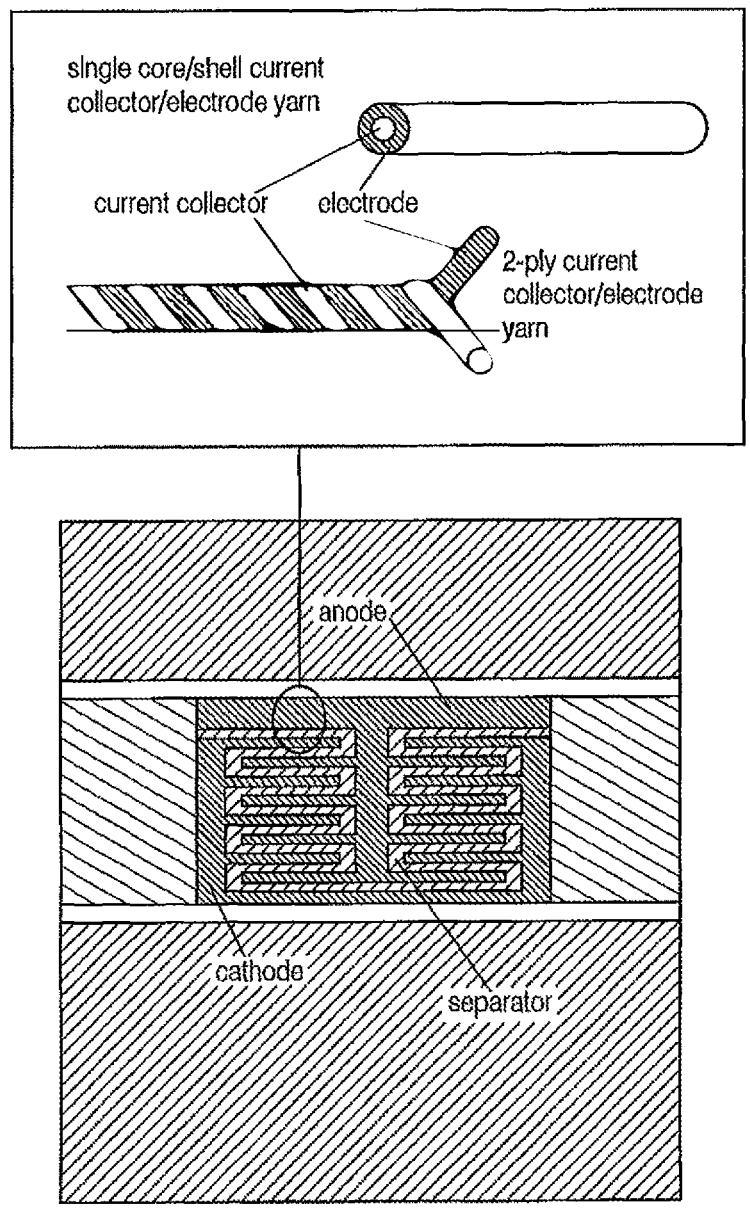
FIG. 2B illustrates an example using a combined current collector and electrode yarn, either twisted together or in a coaxial arrangement.
Figure 2C:
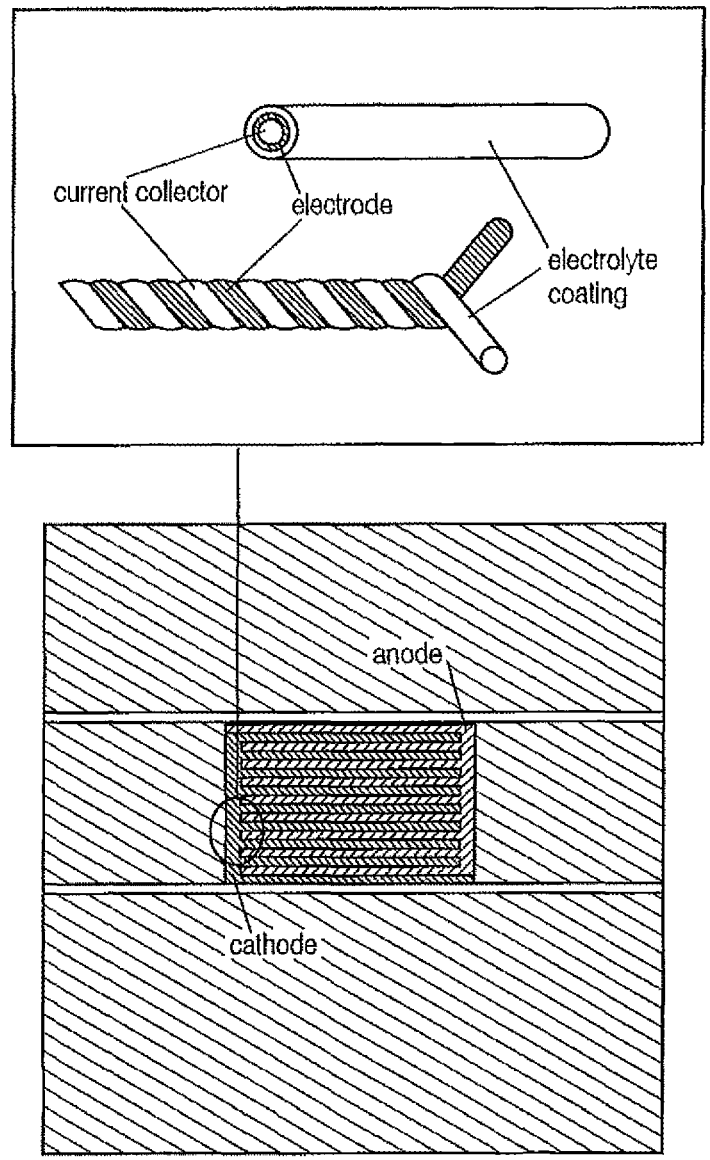
FIG. 2C illustrates an example using a combined current collector and electrode yarn with precoating of an electrolyte.

FIGS. 2A-C depict three different knitted supercapacitor designs. Changes in the design accommodate the types of smart yarns used for the E, CC and electrolyte materials. At FIG. 2A (top), if the E and CC are to be knitted as individual yarns, then at FIG. 2A (bottom) each component can be knitted while maintaining electrical contact between each other. At FIG. 2B (top), two types of yarns are illustrated that integrate the E and CC in the same strand of yarn, either as a core-shell fiber/yarn, or by twisting individual yarns together. These yarns alone make up ½ of the supercapacitor. At FIG. 2B (bottom), a design is depicted that accommodates the CC and E integrated in the same yarn. At FIG. 2C (top), the combined E and CC yarns are shown that are coated in electrolyte prior to knitting. At FIG. 2C (bottom), no spacing between the inter-digitated fingers is needed as the solid electrolyte acts as both the electrolyte and the separator.

FIGS. 2A-C further illustrate what kind of spacing would be required for knitting ECs with different forms of yarn. FIG. 2A (top) shows two separate electrode and current collecting yarns, which would have to be knitted individually and into an arrangement as seen in FIG. 2A (bottom). FIG. 2B (top) shows a combined current collector and electrode yarn, either twisted together or in a coaxial arrangement that could be knitted in the arrangement shown in FIG. 2B (bottom). Lastly, if the combined E-CC yarn is also pre-coated in an electrolyte (as shown in FIG. 2C (top)), no spacing between electrodes is required (see FIG. 2C (bottom)), as the electrolytes electrically insulate the electrodes from each other while facilitating ionic conduction.

In example embodiments, the electrode material is saturated with an electrolyte. As has been reported in the literature, PVA based electrolytes have shown excellent performance when used in supercapacitors. PPO, PEO and Nafion have also been demonstrated as good ion conducting polymers and have been demonstrated in use in batteries and fuel cells. The PVA and phosphoric acids are sold separately but are easily mixed to form a gel that is coated onto the supercapacitive textiles. The electrolyte can either be coated onto the yarns before knitting as in FIG. 2C or coated to the fabric surface after knitting. The advantage of coating before knitting is that the electrolyte is enabled to act as a protective coating from needles that may cause flaking of the activated carbon off of the cotton. Also, coating before knitting does not require the inter-digitated fingers to be separated as seen in FIG. 2A (bottom) and FIG. 2B (bottom).

In a sample embodiment, a recipe for a standard PVA gel electrolyte includes:
1.4 g Polyvinylalcohol (PVA), high molecular weight, Alfa Aesar
1-2 ml Phosphoric acid ($H_3PO_4$) 70% concentrated, Alfa Aesar
5.16 g Silicotungstic acid, Alfa Aesar
20 ml Deionized water, Alfa Aesar Lastly, the anode and cathode cannot be in electrical contact with each other; therefore, an ionically permeable electronic separator is used to allow the electrodes to be in close proximity for slim packaging. In a sample embodiment, the spacing in the knit structure saturated in electrolyte acts as the separator (see FIG. 2B (bottom)). If the yarns are coated in electrolyte prior to knitting, then they are capable of being knitted without any spacing in the knit structure. It will be appreciated that the coating must be at least 50 μm thick in order to also act as the separator.

For the inter-digitated design depicted in FIGS. 2A-C, a plain jersey may have two horizontal rows between each finger, and four vertical rows between the ends in order to avoid contact with one another. If the yarns are coated in electrolyte prior to knitting, then they are capable of being knitted without any spacing in the knit structure. A simple heating at 90° C. for about 20 minutes will form an ionic bond between the coated yarns that are in contact within the knit structure without forming an electrical contact between the anodic and cathodic yarns. The coating is at least 50 μm thick[2] in order to also act as the separator. A thickness of 100 μm has been used to ensure there are no uncoated stray fibers that could cause a short.

Knitting the EC Components:

These EC components and conditions are assembled into knitted ECs using the Shima Seiki Apex-3 Design software to design the intarsia structure and then to subsequently render a program for the machine to knit. The device depicted in FIGS. 3A-E was knitted on the First 4-cam Shima Seiki Machine, which has a limit of 28 carriers per program. This means, with the exception of the beginning and ending waste material (2 carriers), one can create a design that has no more than 26 different yarns. The designs in FIGS. 3A-E and FIGS. 6A-C use at least 10 carriers, and carrier designations are depicted in FIGS. 3E, 5A-C, and 6C, which are explained in the embodiments section below.

Using the intarsia design and simulation software, one can "paint" the desired knit geometry. Every pixel is equivalent to a single stitch/loop. Intarsia knitting is akin to mosaic where different patterns can be introduced as various colors, in the present case one may use the intarsia technique to bring various conductive materials together. One has the ability to change the yarn color and/or the fabric structure, i.e. a loop arrangement. The fabric depicted in FIGS. 3C and 3D is a single jersey knit embedded with different yarns, making up the intarsia pattern. In essence, the color change controls the type of yarn(s) in the fabric, and the structure controls how the needle moves that yarn to create a plain jersey, ribbed knit, purl knit, etc. The simulation software enables one to change the knit structure or the pattern independently, both depicted in a separate data window.

In accordance with exemplary embodiments, the simulation software used for programming custom knit structures allows the user to create new fabric programs in two different ways. The first is 'manual' where the user must be skilled in the art of knit programming on Shima Seiki machines. The second is automatic and allows the user to visually design a flat fabric using color as a representation for knit structures or different yarns; these designs can be automatically processed by the software for machine knitting.

However, the simulation software has limitations. For example, it is sometimes necessary to manually program all custom structures to be sure that conductive components are either in good electrical contact with each other or are electrically insulated. Automatically generating a program may also use more yarn carriers (different yarns), which may inhibit the ability to knit other electric components in the same fabric because each machine has a limitation on the total number of yarns it can incorporate into a fabric. The automatic software also cannot develop 3D spacer fabrics, and currently must be programmed manually for developing 3D spacer fabrics.

Those skilled in the art will appreciate that it is possible to estimate the length of yarn used in a knitted EC based on the number of stiches it is comprised of, as well as at what stitch value it was knitted.

Figure 7:
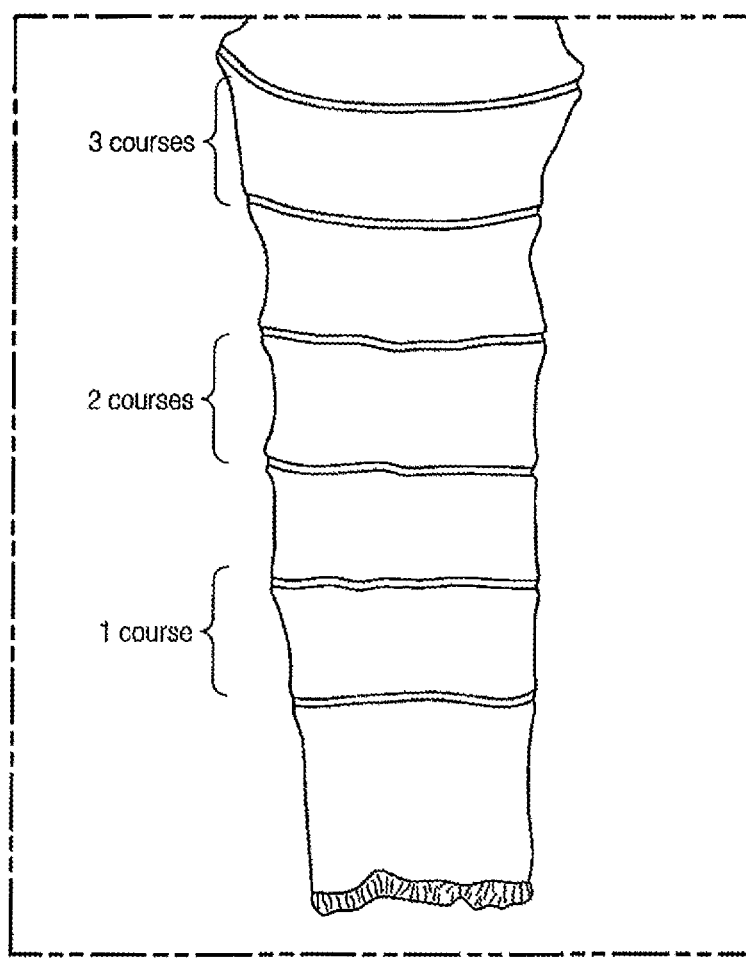
FIG. 7 shows a plain weft knitted wool fabric with stainless steel stripes, each stripe knitted with 1, 2, or 3 courses (rows).

FIG. 7 shows a plain weft knitted wool fabric with stainless steel stripes, each stripe knitted with 1, 2, or 3 courses (rows). The puma wool yarn was measured to have 25 cm of yarn in each knitted row, while the steel yarn was measured to have 21.6 cm per row. As illustrated, the wool fabric is knitted at a stitch value of 45 with a stripe of steel knitted in the middle. Because the steel yarns presented here have no stretch or ease, they must be knitted tighter to produce a flat laying fabric that does not buckle, and were knitted on a stitch value of 37. By unraveling the fabric partly that it was determined that the full length of yarn in one row of wool yarn (45 stitches) was 25 cm long while the steel in the same fabric was only 21.6 cm long. However, if one were to take the ratio of the stitch value (where a higher stitch value means a loop of a longer length), it is found that 21.6/25 cm=0.86, and 37/45 stitch=0.82 are closely the same. Therefore, the total length of yarn can be estimated if the stitch value of the yarn knitted and the number of loops are known. For example, in Equation 5, it is shown that the loop length per stitch ($L_{stitch}$)=baseline length ($L_0$)×(new stitch value ($S_x$)/baseline stitch value ($S_0$)):

$$L_{stitch} = L_0 \cdot \left(\frac{S_x}{S_0}\right). \qquad \text{Eq. 4}$$

Stitch value of 45=loop length of ~0.62 cm×40=24.8 cm
Stitch value of 37=24.8 cm (37/45)=20.33
Stitch value of 20=20/45=0.44×0.62 cm=0.275 cm per loop
If a knitted EC is composed of many rows of varying lengths, the total length can still be determined by counting the total number of stitches in accordance with Equation 5.

Knowing the total length of yarn in the knit structure allows one to engineer a knit with a desired capacitance and resistance. It has previously been demonstrated that knitting multiple rows of conductive material together is similar to wiring resistors in parallel with each other, yielding very similar results. Therefore, the inventors can tune the resistance in the knit structure, not only by adjusting the length, but by knitting multiple rows together.

The resistance of a single row can be determined by multiplying the measured resistance per unit length (cm) by the total length of yarn in that row, as shown in Equation 6 below. As known by those skilled in the art, when resistors are wired in parallel, they are equivalent to the expression in Equation 7. Therefore, if the resistance of each row is the same (because it is made of the same material) it can be estimated that two knitted rows will have ½ the resistance of $R_1$ (Equation 8), and three rows will have ⅓ the resistance (Equation 9), etc. From here, it will be appreciated that a full resistive network may be produced for a knitted EC.

$$R_1 \text{(resistance of a single row)} = \frac{R}{cm} \cdot L \qquad \text{Eq. 5}$$

$$\frac{1}{R_1} + \frac{1}{R_1} = \frac{1}{R_2} \qquad \text{Eq. 6}$$

$$R_2 \text{(resistance of two rows)} = \frac{R_1}{2} \qquad \text{Eq. 7}$$

$$R_3 = \frac{R_1}{3} \qquad \text{Eq. 8}$$

Once the design is finalized, it can be sent to the knit programming software as a predetermined design that is converted into machine language to be knitted by the appropriate knitting machine. The machine is then prepared, respective conductive/electrode yarns and regular yarns are threaded in the designated feeders, and the fabric is knitted.

EMBODIMENTS

FIGS. 3A-E depict a design for an inter-digitated supercapacitor with a heated patch in the form of a resistor (described with respect to FIGS. 14A-D below), its rendered program, and a sample of the real fabric knitted in wool. This fabric has a total electrode yarn length of 51 inches, or 129.5 cm. If this fabric were made with stainless steel yarn as the electrode material, weighing approximately 1 mg/cm and having 2 F/g, it would result in an electrode having 0.258 F, resulting in a device of 0.129 F. Assuming the full device is approximately 8.89×6.35 cm in area, meaning per area, the device stores 2 mF/cm², which is comparable to conventional ceramic or metal plate capacitors.

Figure 3B:
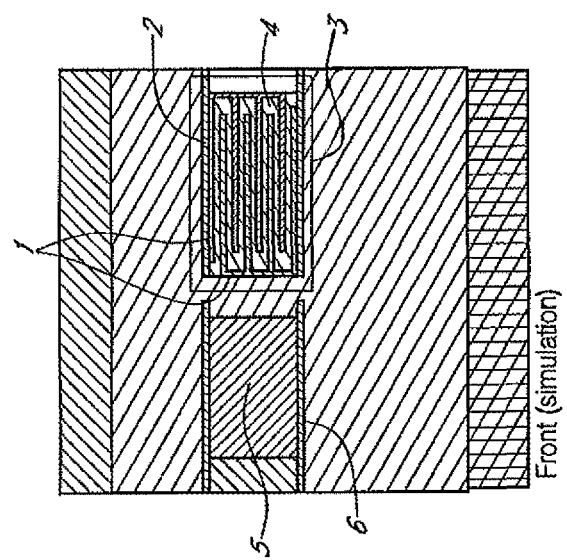
FIG. 3B illustrates a back view of an example design of a fabric.
Figure 3A:
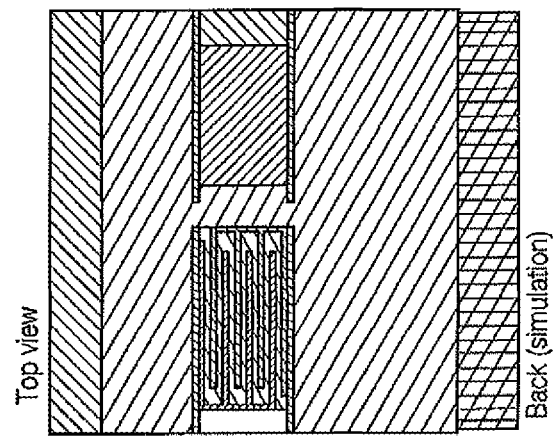
FIG. 3A illustrates a front view of an example design for a fabric having an inter-digitated supercapacitor with a heated patch.
Figure 3D:
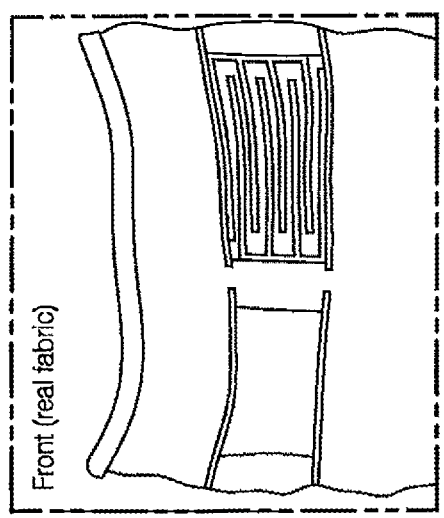
FIG. 3D illustrates a back view of the example fabric knitted in wool.
Figure 3C:
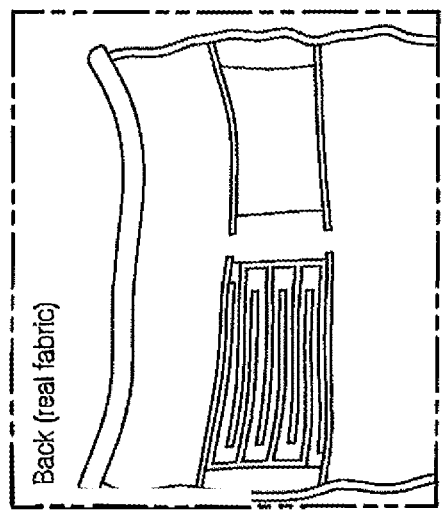
FIG. 3C illustrates a front view of an example fabric knitted in wool.
Figure 3E:
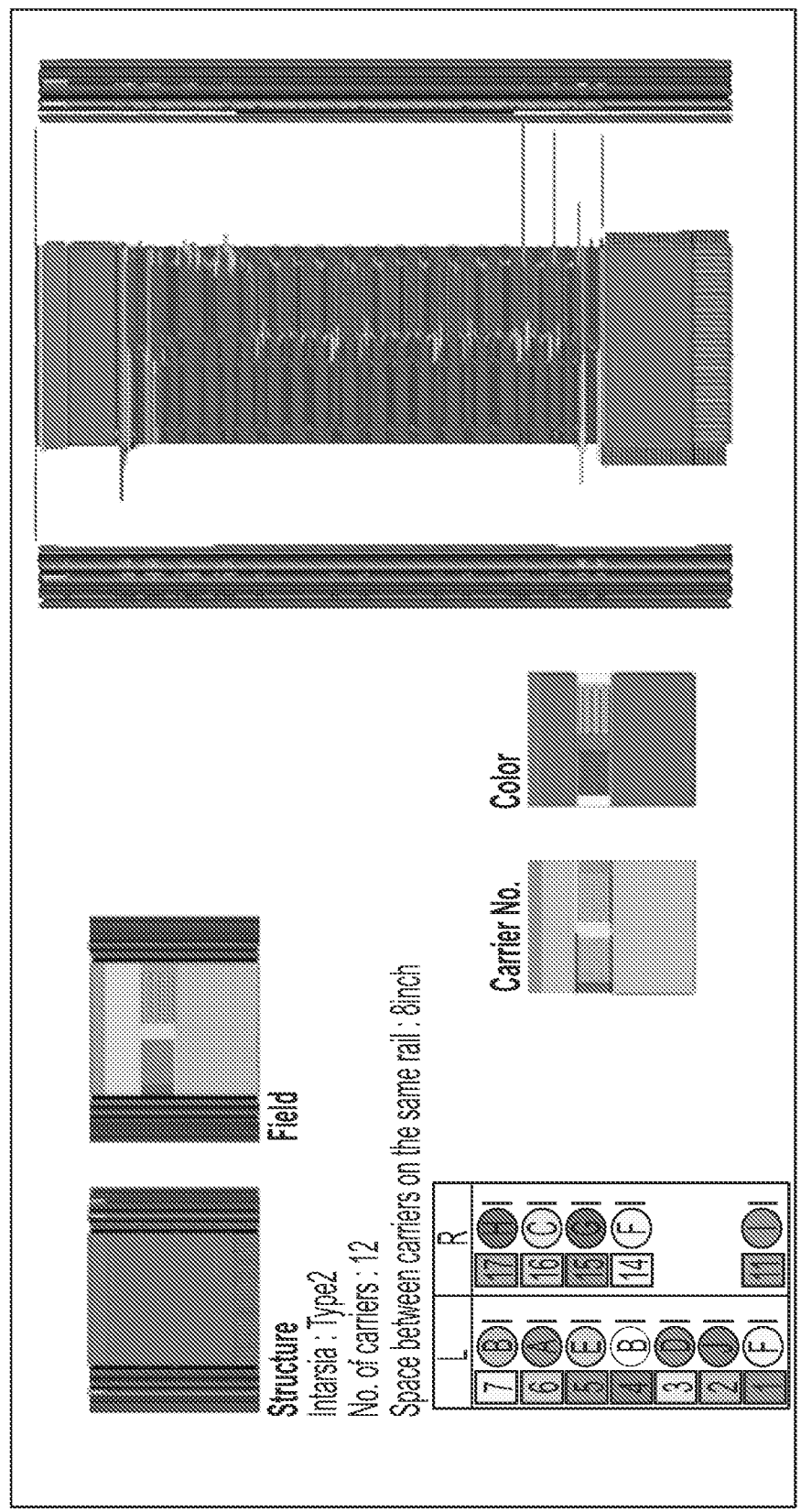
FIG. 3E illustrates an example program for designing fabric.

FIGS. 3A-B depict the simulation and FIGS. 3C-D depict the real image of a fabric design to integrate energy storage and a heated patch. Yarns 1 represent electrode materials, while yarn 2 represents current collector/leads to connect supercapacitor to other devices. Area 3 represents an area that an electrolyte would coat after knitting; however, as noted above, the electrolyte could also be coated into the yarns before knitting. Yarn 4 is a non-conductive yarn (e.g., cotton, wool, polyester, and nylon) knitted between the electrode yarns 1 to separate the yarns and prevent electrical contact. Yarn 5 is a heated patch, and yarn 6 comprises conductive leads to connect the heated patch to the supercapacitor. The spacing between the yarn 2 and yarn 5 allows for the addition of a small sewable switch and LED (not shown). The fabric of FIGS. 3A-E is rendered using the Shima Seiki SDS-ONE design system.

Figure 4A:
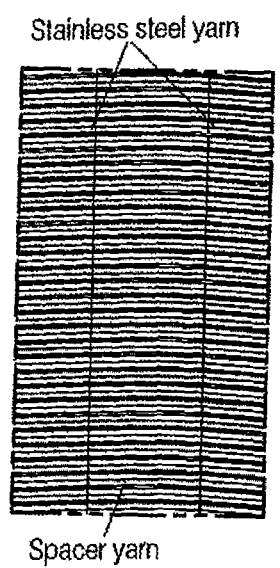
FIG. 4A illustrates a real knitted stainless steel striped supercapacitor sample.
Figure 4B:
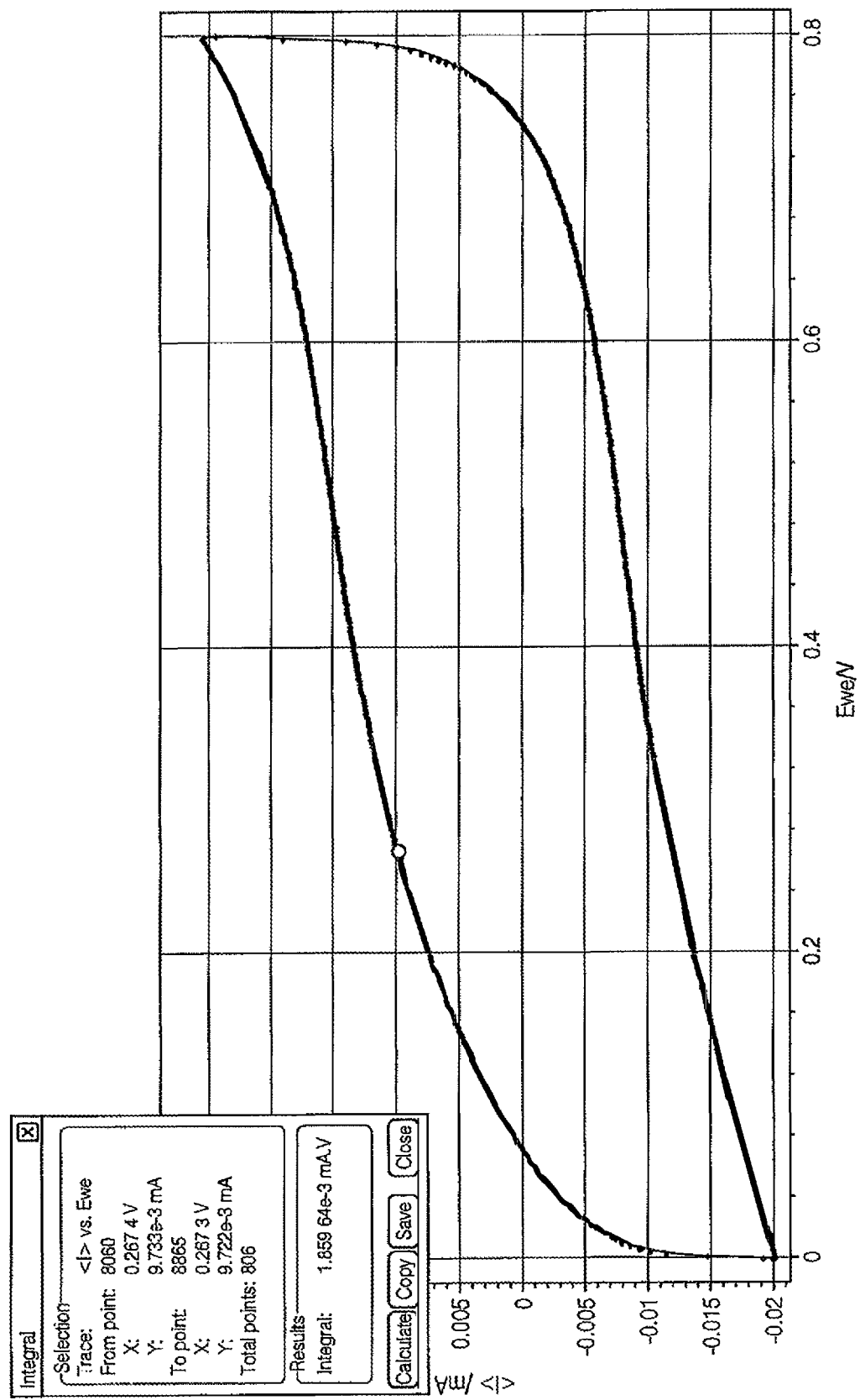
FIG. 4B is a graph illustrating properties of the supercapacitor sample.

FIGS. 4A-B illustrate a real knitted stainless steel striped supercapacitor sample (10 μm fibers, approximately 1 k yarn, Beakart, Germany) that is 4 cm long (16 cm yarn length) resulting in a device capacitance of approximately 1 mF determined using cyclic voltammetry and galvanostatic cycling when scanned at 2 mV/s and 0.2 mA in an 0.8 V window. This results in a capacitance per yarn length of 0.062 mF/cm. This test was conducted on a Biologic VMP3 Potentiostat/galvanostat, commonly used for supercapacitor testing, using a PVA-$H_3PO_4$ electrolyte commonly used for supercapacitors. The device used 2 rows of inactive yarns as the separating material.

If, however, this device had an electrode material that used a high surface area carbon (as previously described), within the same area, one can increase the capacitance significantly given that one knows the mass loading of the carbon, its relative gravimetric capacitance, and now its length of 129.5 cm.

For this prolific example, one can use an activated carbon, with a mass loading per length of 0.25 mg/cm (carbon fabrics are usually lighter than metal fabrics because of its lower density). If the activated carbon has an average of 100 F/g, and one has a total of 129.5 cm at 0.25 mg/cm, one can expect to see a device capacitance of:

$$129.5 \text{ cm} * 0.00025 \text{ g/cm} * 100 \text{ F/g} = 3.23 \text{ F per electrode, or } 1.61 \text{ F per device.}$$

This is more than 200 times higher capacitance than the stainless steel example.

The afore-mentioned article to Jost et al. as well as the article to Jost, et al. entitled "Carbon Coated Textiles for Flexible Energy Storage," Energy and Environmental Science, Vol. 4, pp. 5060-5067 (2011) demonstrate how activated carbon materials can be adapted for cotton and carbon fiber textiles, while having comparable performance and capacitance as a conventional film supercapacitor tested under the same conditions.

Figure 5A:
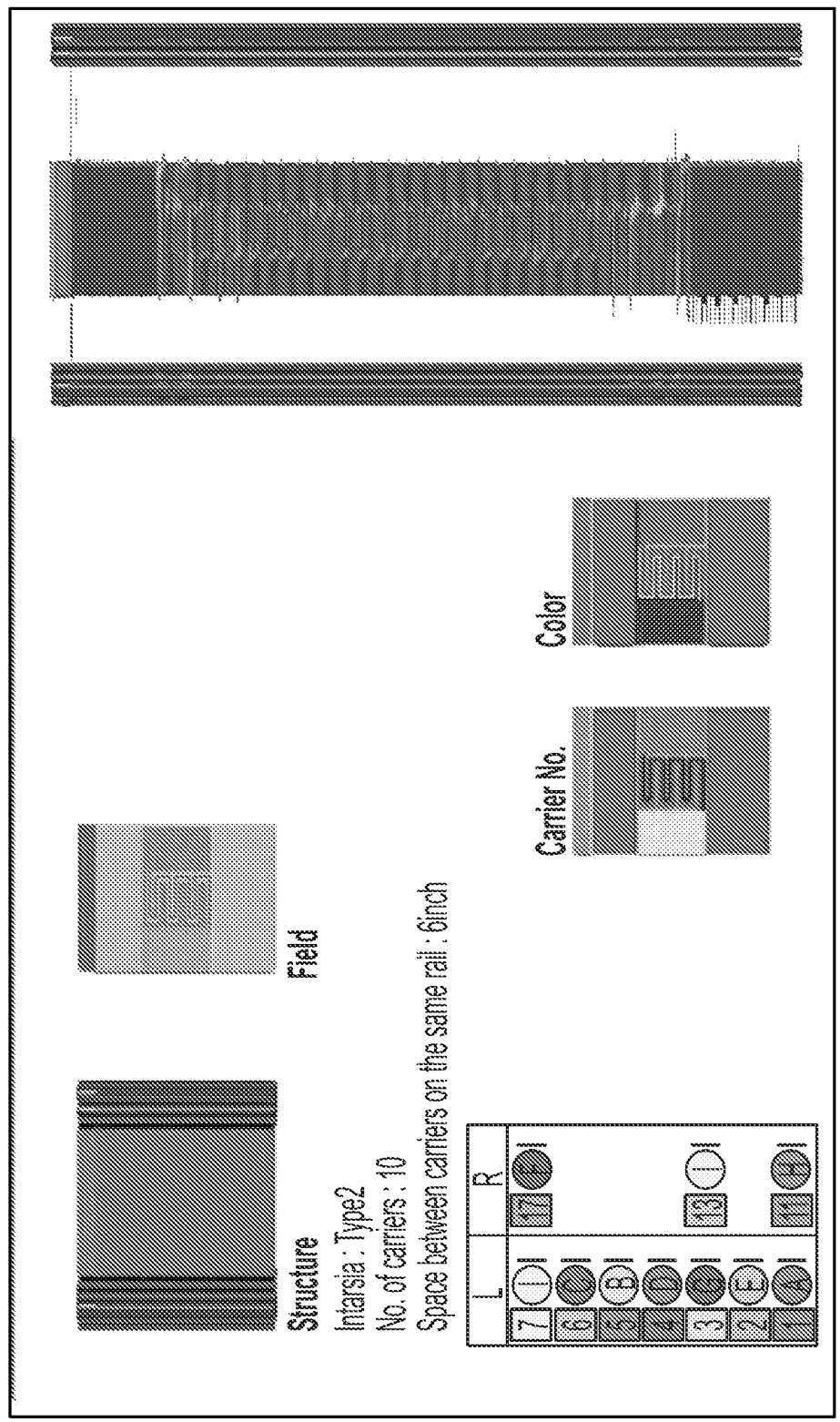
FIG. 5A illustrates a Shima Seiki knit program for knitting an example device.
Figure 5B:
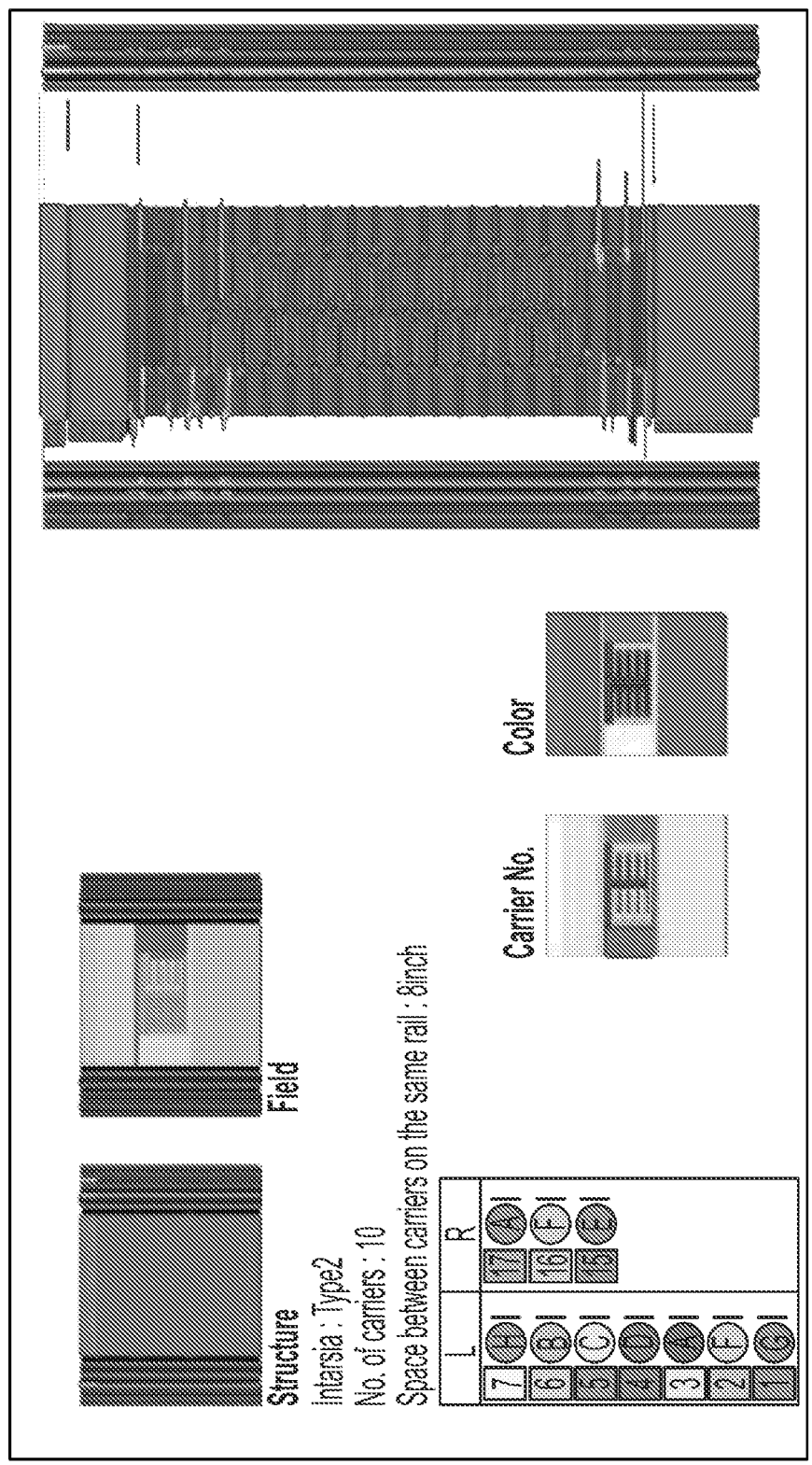
FIG. 5B illustrates another example knit program for an example device.
Figure 5C:
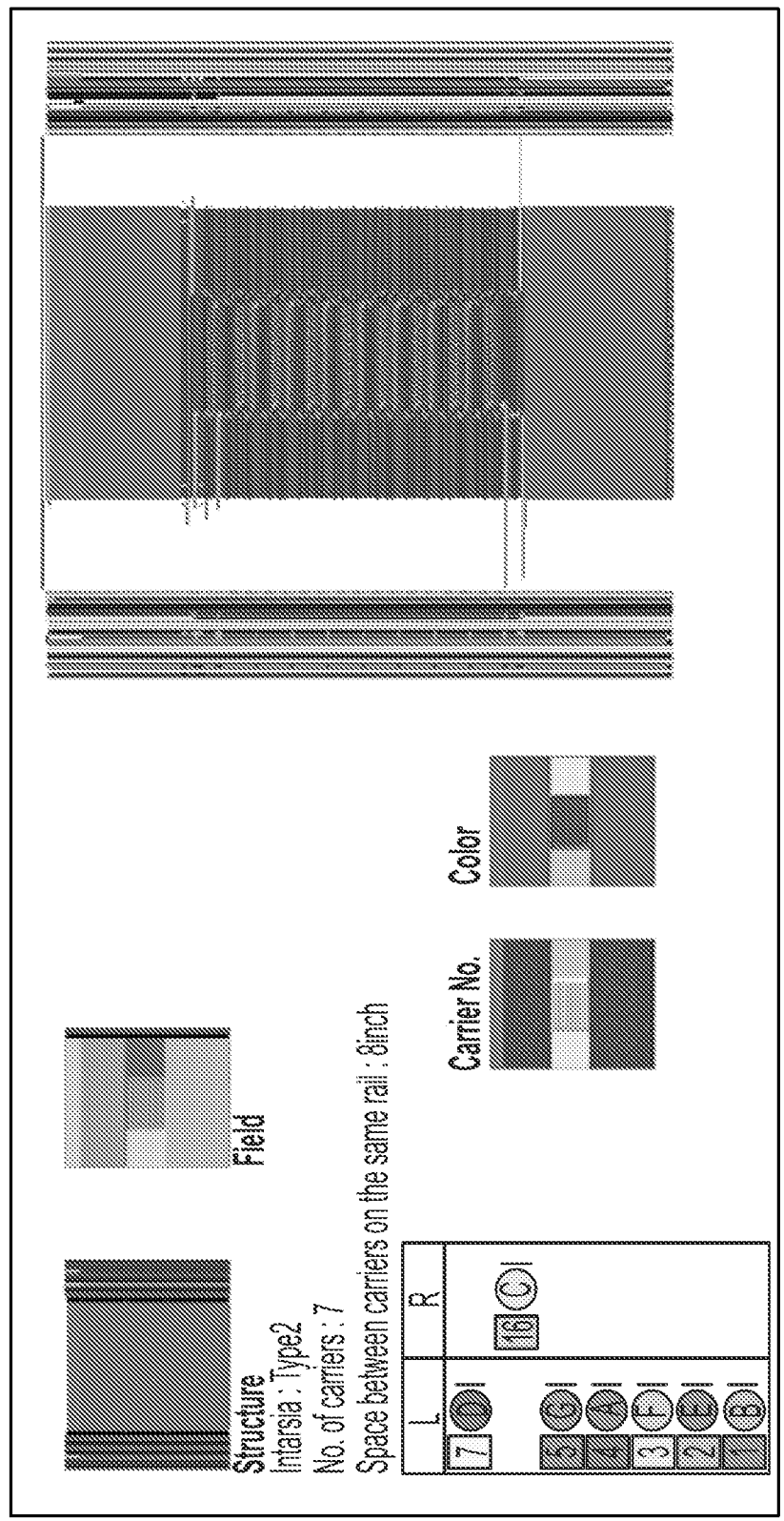
FIG. 5C illustrates another example knit program for an example device.

FIGS. 3A-E and FIGS. 5A-C depict potential knit supercapacitor prototypes ready for manufacture based on the kind of yarn acquired. Each inter-digitated electrode design is depicted with its specified yarn. These designs are intended to aid a maker in recreating a knitted supercapacitor regardless of the type of conductive or capacitive yarn available to them. FIG. 5A illustrates a Shima Seiki knit program for FIG. 3A-E (2); FIG. 5B illustrates a knit program for FIGS. 3A-E (4); and FIG. 5C illustrates a knit program for FIG. 3A-E (6). The programs in FIGS. 5A-C can be easily modified to change the dimensions of the design in FIGS. 3A-E by someone skilled in using the Shima Seiki Apex-3 computerized knitting software.

Figure 6B:
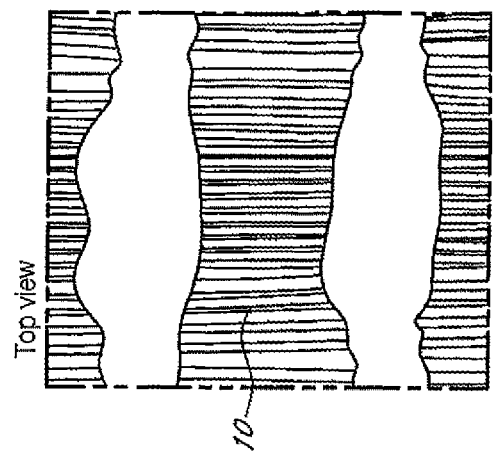
FIG. 6B illustrates a top view of the sample of the fabric made of inert materials.
Figure 6A:
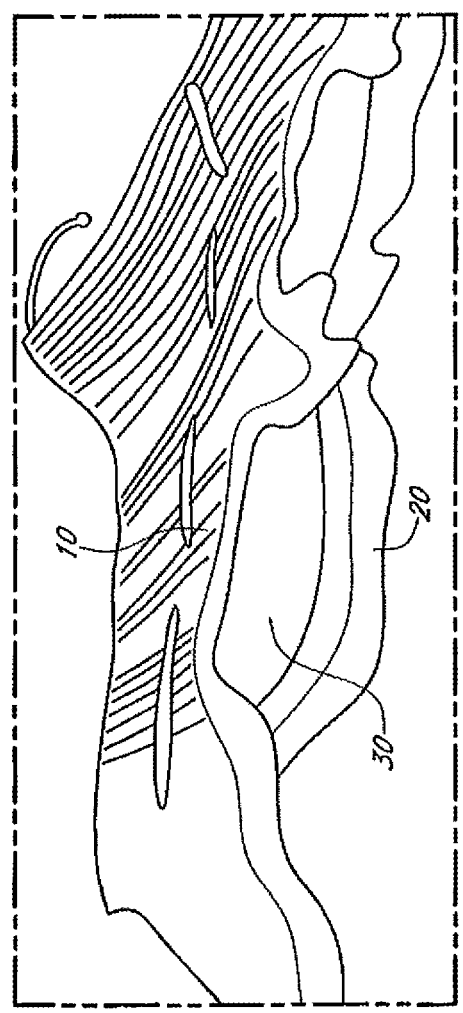
FIG. 6A illustrates a side view of a sample of a fabric made of inert materials.
Figure 6C:
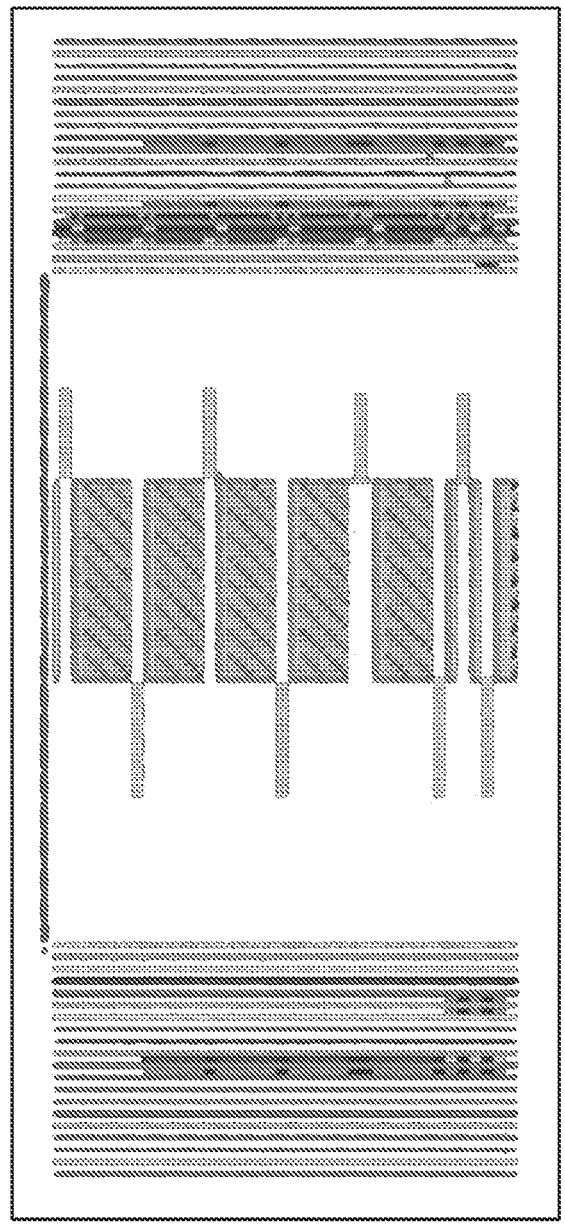
FIG. 6C illustrates an example program representing the most fundamental short section of the fabric.

FIG. 6A illustrates a side view, partly deconstructed, of a fabric made with inert materials. The illustrated fabric is a double layer "spacer" fabric for a textile supercapacitor, having the anode 10 and cathode 20 on opposite sides of the fabric, electrically separated by layers of tucked separating filler yarn 30. FIGS. 6A-C illustrate both a sample of the fabric made of inert materials (top), and a short program representing the most fundamental short section of the fabric (bottom). This double layer fabric is more similar to the sandwiched pouch and coin cell supercapacitors conventionally found in the market. Its design is intended to use as little surface area as possible, resulting in a more energy dense supercapacitor, since one can fit both the anode and cathode in the same area. This fabric is, however, thicker than the previously described inter-digitated textiles, but would also be produced from the knitting machine as one piece of fabric.

FIGS. 8A-I, FIG. 9, and FIGS. 10A-F describes functional and prolific embodiments for knitted fabrics incorporating all elements of an EC: the electrode material, current collector, electrolyte and separator. The material requirements for these devices to operate are described in the materials section above.

Figure 8F:
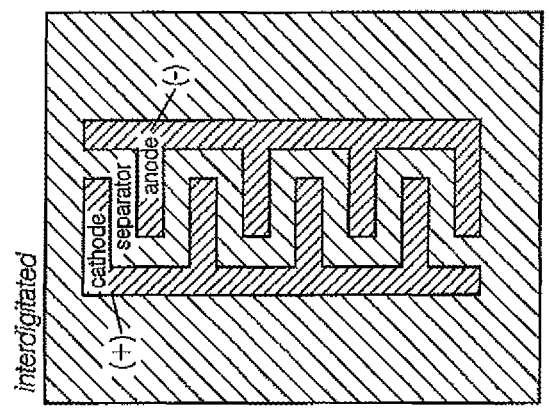
FIG. 8F illustrates inter-digitated EC.
Figure 8E:
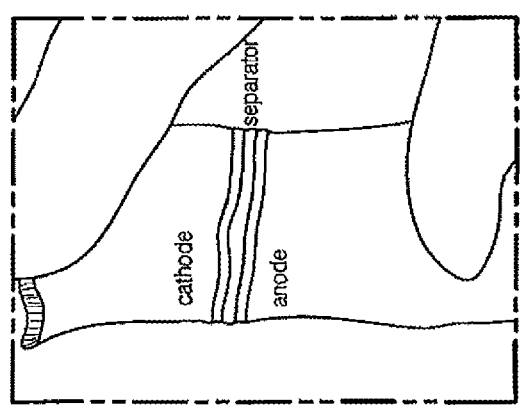
FIG. 8E illustrates stripe EC knitted with steel and activated carbon embedded yarn.
Figure 8I:
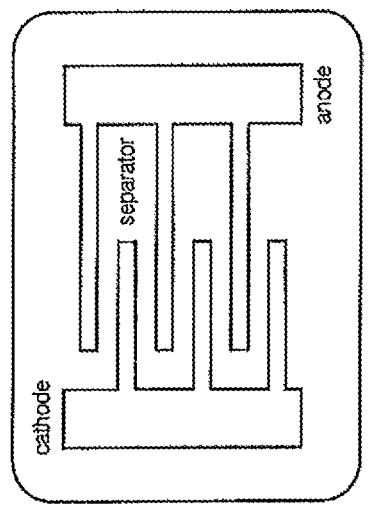
FIG. 8I illustrates inter-digitated EC in stainless steel with modified finger lengths on one side demonstrating the ability to make these asymmetric.
Figure 8H:
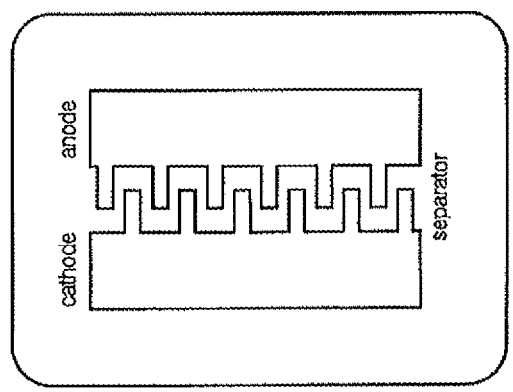
FIG. 8H illustrates a modified pattern of knitted EC with smaller fingers and wider sides.
Figure 8G:
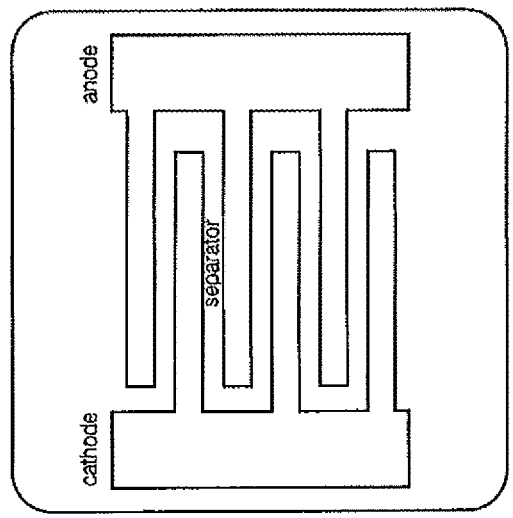
FIG. 8G illustrates knitted inter-digitated EC in stainless steel yarn.

As shown stripe EC geometry is illustrated in FIG. 8A, knitted stripe EC in stainless steel yarn is illustrated in FIG. 8B, insulated stripe EC geometry is illustrated in FIG. 8C, insulated stripe EC knitted in stainless steel yarn is illustrated in FIG. 8D, and stripe EC knitted with steel and activated carbon embedded yarn is illustrated in FIG. 8E. As further shown, inter-digitated EC is illustrated in FIG. 8F, knitted inter-digitated EC in stainless steel yarn is illustrated in FIG. 8G, a modified pattern of knitted EC with smaller fingers and wider sides is illustrated in FIG. 8H, and inter-digitated EC in stainless steel with modified finger lengths on one side demonstrating the ability to make these asymmetric is illustrated in FIG. 8I. All samples in FIGS. 8A-I were knitted on a SWG-122SV Shima Seiki machine.

The stripe EC (FIGS. 8A-B) is appropriate for small devices, or to act as design components (stripes) for color in garments without appearing to be a device itself. On the other hand, insulated stripe EC (FIGS. 8C-D) is for the same electrical geometry as the stripe EC but is insulated inside two layers of fabric for added safety and no skin contact. These designs may be ideal for electrode materials that have a potential to cause skin irritation, but can still be incorporated into the garment safely. Inter-digitated EC (FIGS. 8F-I) illustrate an extension of the stripe SC, where this geometry is really multiple stripes wired in series with each other. This is best for situations where the device must be contained within a single-layer sheet of fabric (2D only). Also a common geometry is used for micro-supercapacitors.

Figure 9:
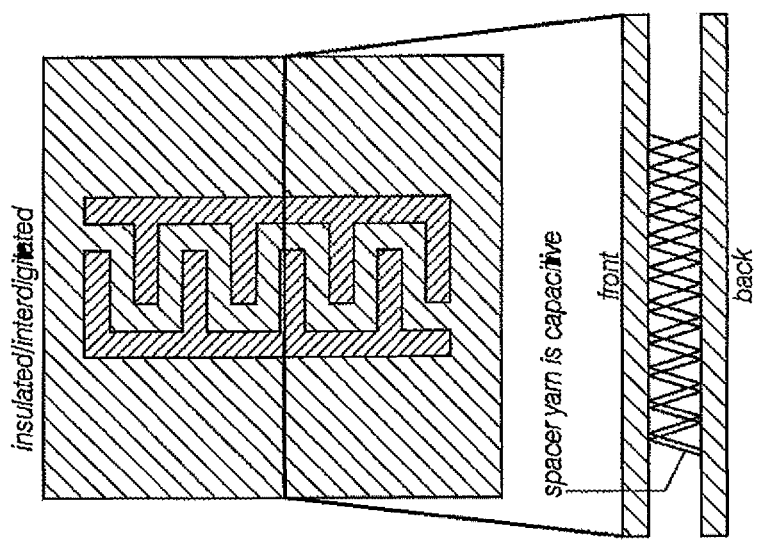
FIG. 9 illustrates an insulated inter-digitated EC of an exemplary embodiment.

The insulated inter-digitated EC shown in FIG. 9 has the same geometry as the inter-digitated EC, but it is knitted between two layers of non-conductive fabric (similar to the insulated stripe EC). In this embodiment, the spacer yarn is capacitive between the front and back of the fabric. Such a configuration is best for small devices that may not be ideal for direct contact with the skin.

Figure 10D:
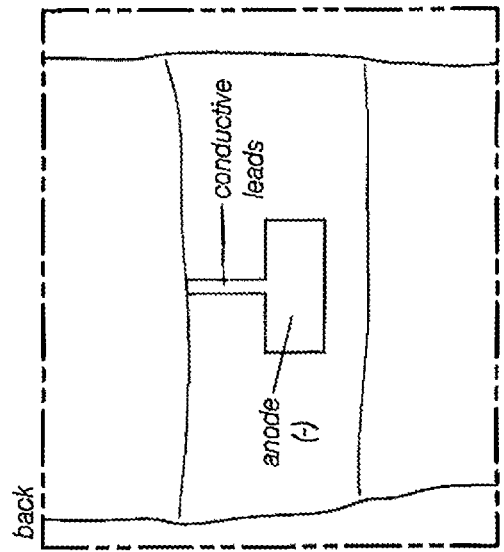
FIG. 10D illustrates a back of spacer EC knitted with 5 carriers.
Figure 10C:
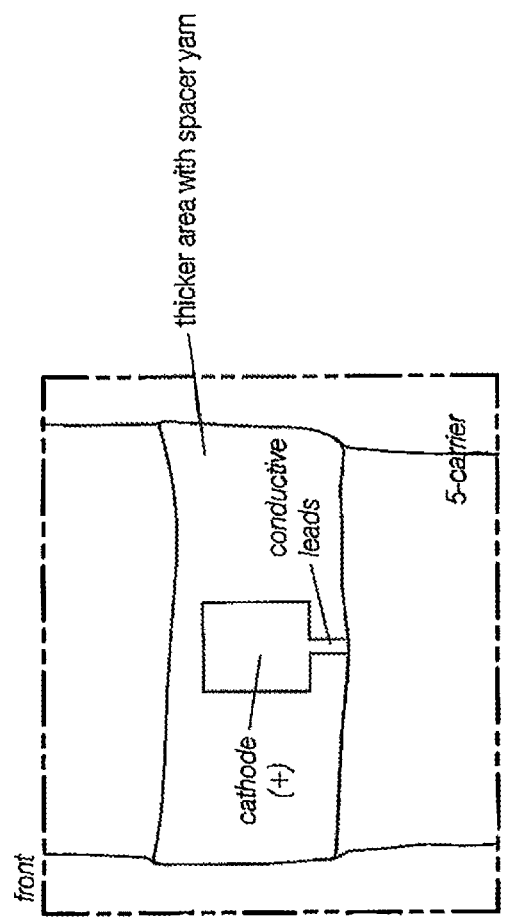
FIG. 10C illustrates a front of spacer EC knitted with 5 carriers.
Figure 10F:
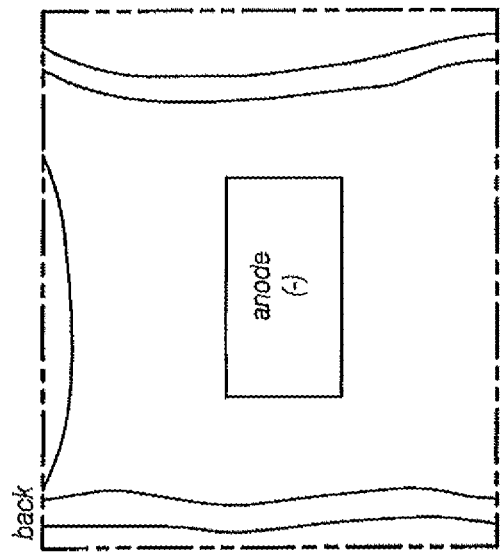
FIG. 10F illustrates a back of spacer EC made with 7 carriers.
Figure 10E:
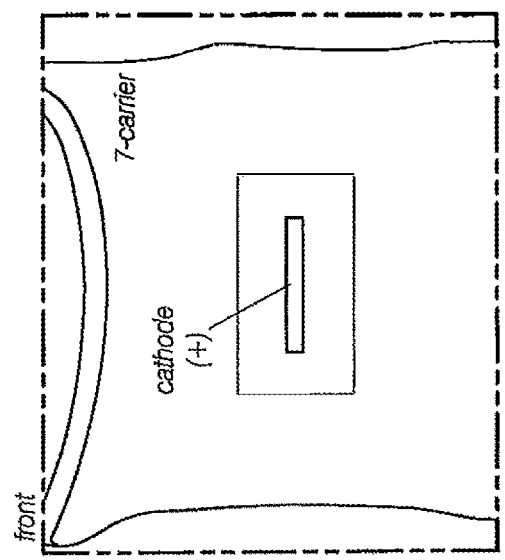
FIG. 10E illustrates a front of spacer EC made with 7 carriers.

As shown, a spacer EC front a showing cathode is illustrated in FIG. 10A (top), a spacer EC back with anode is illustrated in FIG. 10B, a cross-sectional illustration of spacer yarn acting as an electrical insulator between the two electrodes, but with sufficient porosity to allow electrolyte ions to flow through is illustrated in FIG. 10A (bottom), a front of spacer EC knitted with 5 carriers is illustrated in FIG. 10C, a back of spacer EC knitted with 5 carriers is illustrated in FIG. 10D, a front of spacer EC made with 7 carriers is illustrated in FIG. 10E, and a back of spacer EC made with 7 carriers is illustrated in FIG. 10F. In each embodiment, the spacer EC includes two layers of fabric, each with a small square electrode, knitted together and connected by a spacer yarn that also electrically insulates the electrodes from each other. This geometry has approximately 3 times the energy density per area compared to the stripe/inter-digitated geometry because the electrodes and separating space are stacked on top of each other. Because the electrodes are also knitted in squares, as compared to long stripes, the resistance is also the lowest in this geometry. However, this results in a thicker fabric.

For the inter-digitated designs of FIGS. 10A-F, the electrodes ideally have two horizontal rows between each finger, and 2 vertical rows between the ends in order to avoid contact with one another. A single horizontal row may result in electrode touching and an electrically shorted device. However, increasing the space between electrodes means ions have further to travel, resulting in slower charging times.

Figure 11:
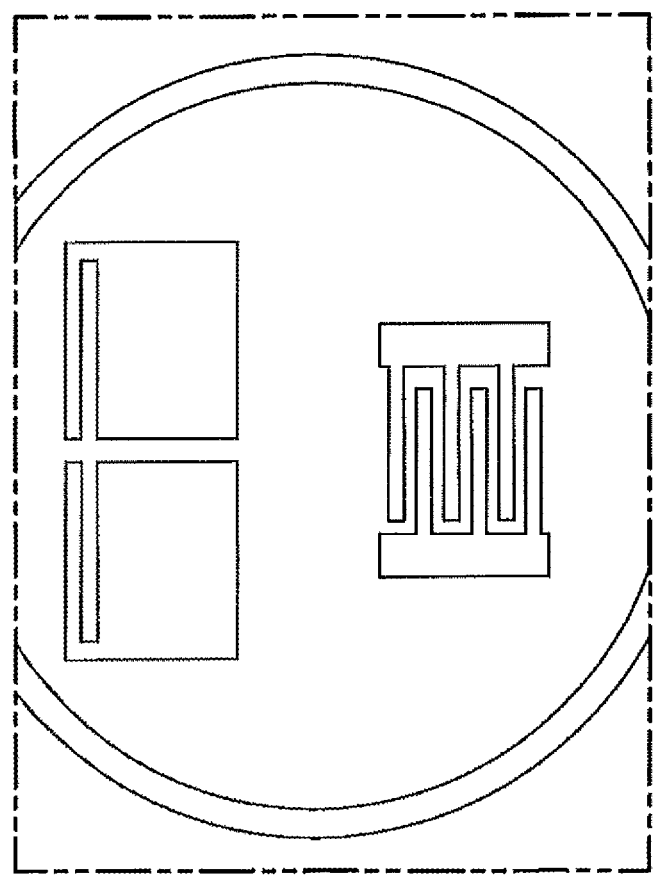
FIG. 11 illustrates a knitted antenna for harvesting WiFi energy knitted in the same piece of fabric as an inter-digitated EC which stores the collected energy.

FIG. 11 illustrates a knitted antenna for harvesting WiFi energy knitted in the same piece of fabric as an inter-digitated EC which stores the collected energy. The embodiment of FIG. 6 thus embodies a knitted inter-digitated EC combined with a knitted WiFi harvesting antenna as an example of the ability to knit multiple electrical devices within the same piece of fabric.

Figure 12A:
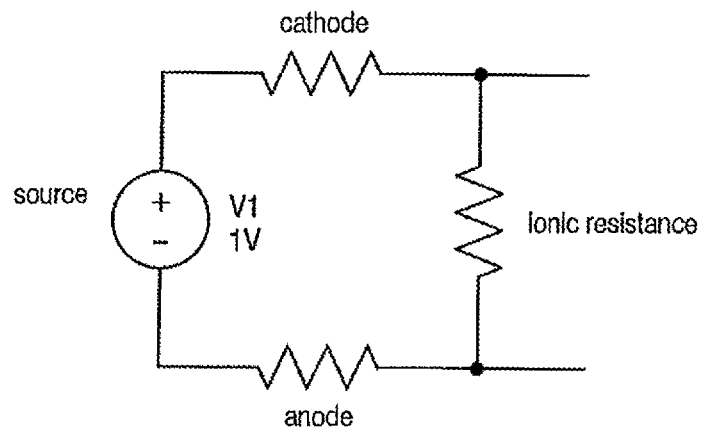
FIG. 12A illustrates a proposed circuit for a striped EC.
Figure 12B:
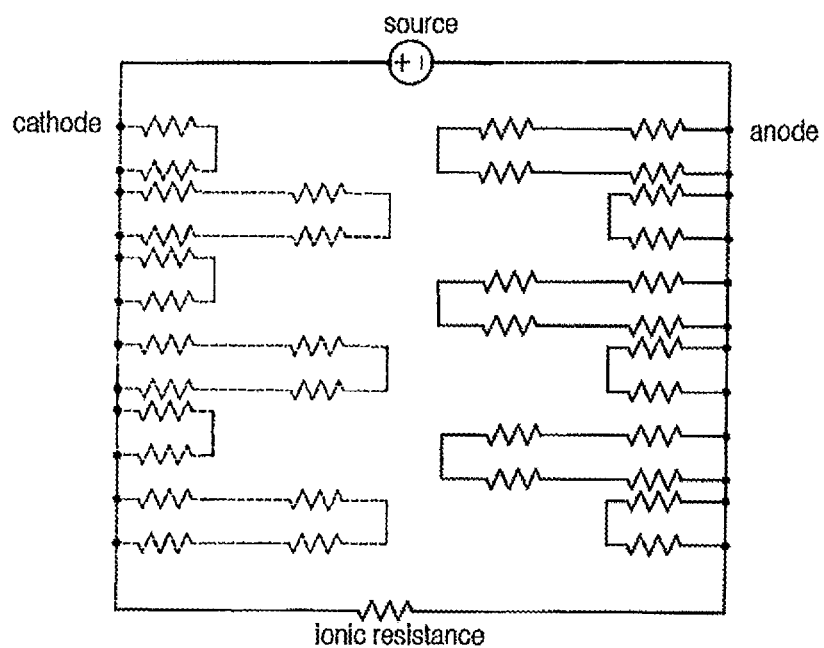
FIG. 12B illustrates a proposed circuit for an inter-digitated EC.

FIG. 12A illustrates a proposed circuit diagram for a striped EC, including the resistances of the cathode, anode, and ionic resistance due to the electrolyte. FIG. 12B illustrates a proposed resistive network model for the inter-digitated EC, where each resistor is representative of a loop, to be scaled up or down, and each array of resistors is for each electrode, a voltage source, and a resistor associated with the ionic resistance due to the electrolyte which is determined experimentally. FIGS. 12A-B thus embodies two proposed circuits for the resistive models of the stripe EC (FIG. 12A) and an inter-digitated EC (FIG. 12B). Each anode and cathode has an internal resistance based on the electrical resistance of the yarns used, as well as the total length used. Because the resistance can be estimated (as shown in FIGS. 1A-C), predictive models can be built for a capacitor's performance and expand upon the basic circuits shown.

Figure 13:
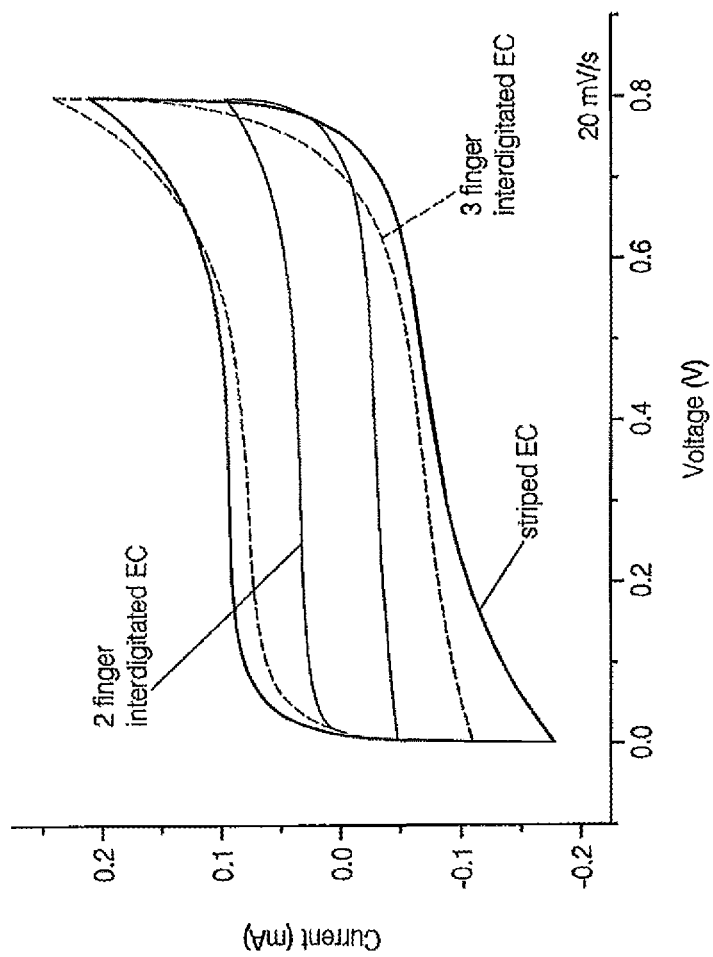
FIG. 13 illustrates cyclic voltammetry for symmetric stainless steel knitted supercapacitors, including a 2 finger inter-digitated EC (~2 mF), a 3 finger inter-digitated EC (~5 mF), and a stripe EC (~5 mF) as seen in FIG. 7.

FIG. 13 illustrates electrochemical results for three different kinds of knitted EC devices, tested at 20 mV/s in a PVA-H$_3$PO$_4$ electrolyte in a 0.8 V window. PVA-H$_3$PO$_4$ is an electrolyte commonly used for supercapacitors. FIG. 13 illustrates cyclic voltammetry for symmetric stainless steel knitted supercapacitors, including a 2 finger inter-digitated EC (~2 mF), a 3 finger inter-digitated EC (~5 mF), and a stripe EC (~5 mF) as seen in FIG. 7. All devices demonstrate good electrochemical performance, and rectangular behavior. Some peaking at 0.8 V is representative of some electrolyte decomposition or impurities, but is not caused by the knit structure. If, however, these devices had electrode materials that used high surface area carbon (as previously described) within the same area, the capacitance may be increased significantly given that the mass loading of the carbon is known, as is its relative gravimetric capacitance and its estimated length.

FIG. 8E embodies an example of a stripe EC knitted with a non-commercially available carbon embedded yarn. Previous publications of the inventors as referenced above demonstrate that how activated carbon materials can be adapted for cotton and carbon fiber textiles, while having comparable performance and capacitance as a conventional film supercapacitor tested under the same conditions.

From the above, it is apparent that the textile EC geometry and processing can have an effect on the performance, and that using an optimized knit structure will allow the EC materials to perform comparably to their conventional non-textile counterparts. For example, it will be appreciated that a striped EC's components and function may be incorporated into a full garment.

Heated Knit Fabrics/Garments

Heated clothing has already found many applications for people who live and work in cold climates. Some examples include Columbia Sportswear Company's heated jackets or Gerbing's heated gloves. These garments/accessories are often comprised of multiple layers of thick fabrics, while batteries to power the heating elements are sandwiched between these layers. The techniques described herein may also be used to form heated fabrics. In contrast with the prior art designs, the proposed heated fabrics can be knitted as single or double layer textiles with other electrical components (e.g., wiring or energy storage) embedded within the same sheet of fabric during manufacturing. Additionally, because of the whole garment capabilities of the MACH2X Shima Seiki Knitting Machine, it is possible to also knit seamless garments and accessories with these components. Such garments will be described below.

Experimental/Fabrication Description:

Heated fabrics typically operate using "resistive" or "joule" heating, where the amount of heat in joules (Q) is equivalent to the current (I) squared, multiplied by the resistance (R) of the fabric.

$$Q=I^2 \cdot R \qquad \text{Eq. 9}$$

This means one can increase or decrease the temperature by manipulating the input current and resistance of the material. The temperature change will also depend on the specific heat of the conductive medium and its total mass as shown in Eq. 10:

$$Q=cm\Delta T \qquad \text{Eq. 10}$$

where Q again is the heat in joules, c is the specific heat (J/g-K) of the material, m is the mass of the material (grams) and $\Delta T$ is the change in temperature. Because one wants to determine what the temperature change will be, this equation can be rearranged for T, where $T_{RT}$ is the room temperature of approximately 23° C.

$$T-T_{RT}=Q/cm \qquad \text{Eq. 11}$$

Now one can clearly see that the temperature change will depend not only on how much current is supplied, or the resistance of the fabric, but a material may be chosen with a low specific heat to further increase the temperature.

By designing the resistance and mass of the fabric, ideally more heat will be generated from materials that have high resistance per unit mass. When designing the knitted fabric, one can design intarsia geometries that cover large surface areas but have high resistance. Much like wire, the longer an individual strand of yarn is, the greater the resistance becomes, as this linear conductor acts like many smaller resistors in series. However, the resistance decreases when yarns are in parallel with each other. Therefore, large intertwining patches of conductive yarn (non-insulated) will have a lower resistance than a single strand. If the yarn is insulated, then regardless of the geometry, it cannot act as yarns in parallel and will result in the highest possible resistance. Using intarsia knitting, the resistance across a given area can be carefully tuned by knitting the material in series and parallel as desired.

Figures 14A, 14B:
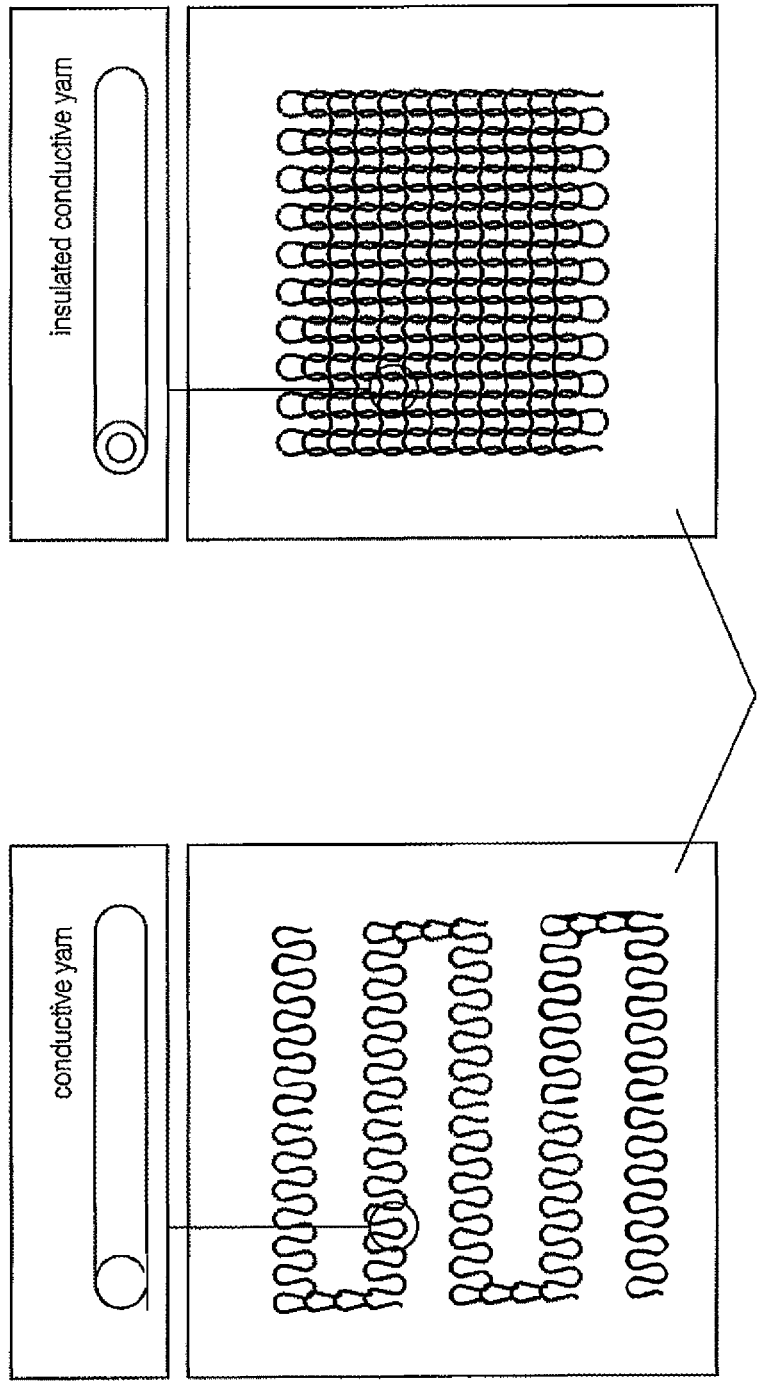
FIG. 14A illustrates a first example geometry to maximize the resistance per area for use as a heated fabric.
FIG. 14B illustrates a second example geometry to maximize the resistance per area for use as a heated fabric.
Figure 14C:
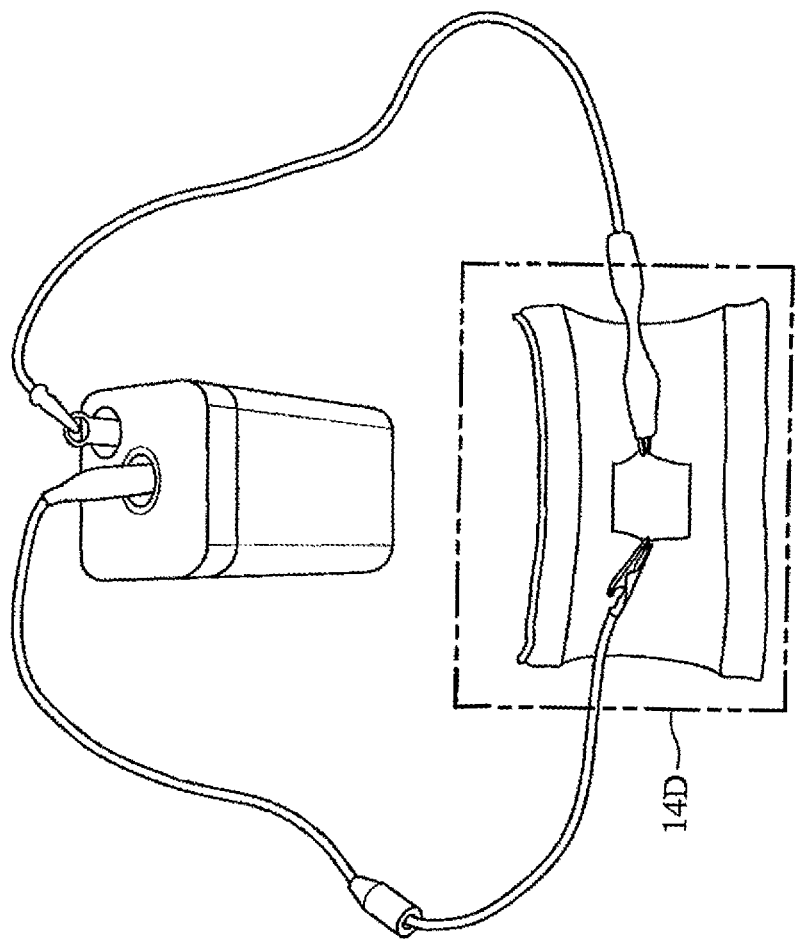
FIG. 14C illustrates a resistive carbon fiber patch that can be warmed by a 6V battery.
Figure 14D:
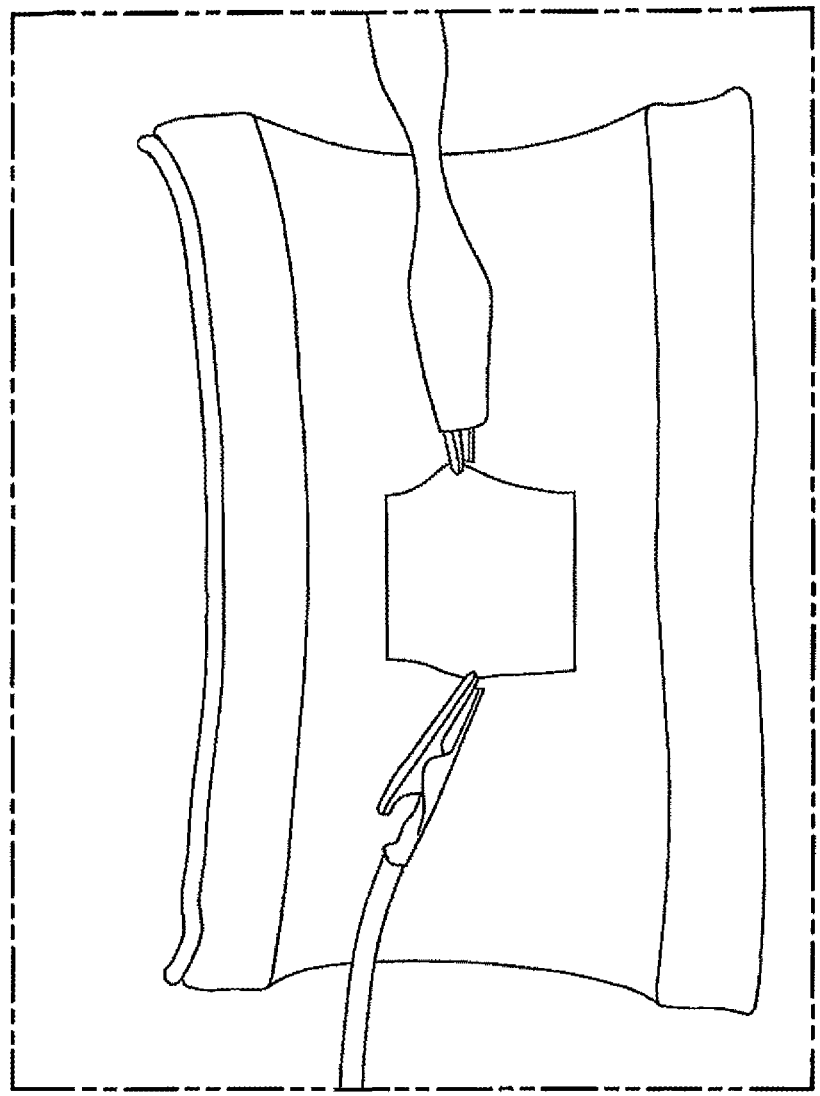
FIG. 14D illustrates a close-up of the example patch.

FIGS. 14A-B depict two possible geometries for an insulated and non-insulated yarn that maximize the resistance per area for a knitted conductive fabric that may be heated. Conductive yarn (non-insulated) at the top of FIG. 14A is knitted into a snake chain at the bottom of FIG. 14A, making the entire yarn a linear resistor. Insulated conductive yarn at the top of FIG. 14B is knitted at the bottom of FIG. 14B as a sheet of fabric. As shown in FIG. 14C, a resistive carbon fiber patch that can be warmed by a 6V battery. A close-up of this patch is shown in FIG. 14D. If the conductive yarn at the top of FIG. 14A is fully exposed, to have the highest resistance (and subsequently the most heating) it would be knitted as a long continuous strand, not overlapping itself. For insulated yarns for heating, they can be knitted in almost any arrangement, as knitting multiple rows together will not wire them in parallel, nor subsequently reduce their resistance.

Once Q is determined for a desired temperature change ($\Delta T$), one can also calculate what kind of energy storage will be required to power this patch. Typically, batteries are used to supply a constant source of power over a long period of time. However, there are no knittable battery materials in existence at this time. Because of this, for the demonstration of heating these fabrics, the inventors have integrated knitted supercapacitors into the same sheet of fabric to be connected to the heating elements to power same.

The energy of the device is described by Eq. 13:

$$Q = \tfrac{1}{2} C V^2 \qquad \text{Eq. 12}$$

where Q (joules) is the energy stored, C is the device capacitance (Farads), and V is the operational voltage window. The knitted supercapacitors typically operate within a 1V window; therefore, if Q is known, one can easily determine what size supercapacitor will be required. The time spent heating the fabric will be proportional to the time constant (discharge time) of the capacitor, which is usually on the order of approximately 10 seconds. However, the inter-digitated capacitor design is easily adapted for batteries if the electrode materials can be developed as textiles. It will be appreciated by those skilled in the art that such knitted supercapacitors and heating elements may be sewn into fabrics to provide heating as desired.

Safety Concerns:

Because these fabrics are heating, it would be ideal to use them in combination with fire resistant or retardant yarns to eliminate the chance of the garments catching fire. In addition, the previously described layered heated jackets and gloves also have layers in order to prevent the chance for electric shock. It may also be ideal to use an insulated conductive yarn for the heated fabric. Insulation will not only protect the wearer from any possible electric shock or fire, but also protect the conductive material from corrosion due to sweat or other impurities.

Similarly to the knitted supercapacitor described above, the heated fabric is made using the same intarsia knitting technique designed on the Shima Seiki SDS Apex-3.

Potential resistive yarns to be used for the heated fabric include but are not limited to:

X-static: silver embedded polyester spandex yarn, Nobel Biomaterials Inc.

Carbon fiber yarn: Pharr Yarns, chopped 1 k tow fiber, 7 μm in diameter fibers

Stainless steel yarn: Beakart, Germany. 1 k tow, 10 μm fibers. 100% stainless steel.

Fire retardant yarn, Aramid Yarn Company

Insubstantial changes from the claimed subject matter as viewed by a person with ordinary skill in the art, now known or later devised, are expressly contemplated as being equivalently within the scope of the claims. For example, all of the designs described herein can be made in almost any shape—e.g., the inter-digitated designs can be heart shaped, circular, or compose any design as long as the electrodes remain inter-digitated and satisfy the functional requirements to operate as a supercapacitor. The same is true for the non-inter-digitated geometries. Therefore, obvious substitutions now or later known to one with ordinary skill in the art are defined to be within the scope of the defined elements.

The invention claimed is:

1. A textile comprising:
   a first conductive yarn knitted so as to form a current collector;
   a second conductive yarn knitted so as to form an electrode that is in electrical contact with the current collector, the first conductive yarn and the second conductive yarns being knitted into an intarsia knitted pattern comprising a completed supercapacitor having an anode and a cathode that are in such proximity that the anode and cathode in the intarsia knitted pattern are sufficiently close to one another to store a charge sufficient to power an electrical component electrically coupled to the supercapacitor, wherein the intarsia knitted pattern is produced by forming a patterned section of a fabric by knitting a plurality of loops arranging the first conductive yarn and the second conductive yarn in a design configured to function as the supercapacitor, wherein the first and second conductive yarns are integrated into a same strand of yarn, either as a core-shell yarn or by twisting the first and second conductive yarns together, and are knitted into the intarsia knitted pattern;
   an electrolyte applied at least to the electrode; and
   an ironically permeable separator that allows the anode and the cathode to be in the close proximity to each other without being in contact with each other.

2. The textile of claim 1, wherein at least a portion of the intarsia knitted pattern comprises at least a portion of the anode being knitted 4 rows or less of knitting apart from at least a portion of the cathode.

3. The textile of claim 1, wherein the intarsia knitted pattern disposes the anode and cathode within sufficient proximity to enable the supercapacitor to operate within a 1 V window.

4. The textile of claim 1, wherein the electrical component comprises one or more of a component knitted into the fabric, a heating component, a heart rate monitor, a cooling component, a wearable device, a smart device, or a sensor.

5. The textile of claim 1, wherein the first conductive yarn and the second conductive yarn are one or more of: in an intertwining knit structure, are plated to each other, or are plied to each other.

6. The textile of claim 1, wherein the intarsia knitting pattern is based on an intarsia geometric pattern input by a user to an automated knitting machine.

7. The textile of claim 1, wherein the electrolyte comprises one or more of an ion conducting polymer based electrolyte or a polyvinyl alcohol (PVA) based electrolyte mixed with phosphoric acid.

8. The textile of claim 1, wherein the first conductive yarn and the second conductive yarn are formed into two layers of fabric having the anode and cathode on opposite sides of the two layers of fabric, the two layers being one or more of electrically separated by at least one layer of tucked yarn or insulated by a spacer yarn that electrically insulates the anode and cathode from each other.

9. The textile of claim 1, further comprising a heating element formed by an insulated conductive yarn knitted into a sheet of fabric, wherein the heating element is connected to the supercapacitor via a switch.

10. The textile of claim 1, wherein the intarsia knitted pattern inter-digitates the first conductive yarn and the second conductive yarn.

11. A method of creating a textile including a supercapacitor, comprising:
   calculating resistance of one or more of a first conductive yarn or a second conductive yarn as a function of length of yarn in each knitted row of an intarsia knitted pattern;
   knitting, according to a predetermined resistance or capacitance characteristic, the first conductive yarn and the second conductive yarn into the intarsia knitted pattern, wherein the intarsia knitted pattern comprises a completed supercapacitor having an anode and a cathode that are in such proximity that the anode and cathode in the intarsia knitted pattern are sufficiently close to store a charge sufficient to power an electrical component electrically coupled to the supercapacitor, wherein the intarsia knitted pattern is produced by forming a patterned section of a fabric by knitting a plurality of loops arranging the first conductive yarn and the second conductive yarn in a design configured to function as the supercapacitor; and applying an electrolyte to at least the second conductive yarn one or more of before or after knitting the first conductive yarn and the second conductive yarn into the supercapacitor, wherein an ionically permeable separator allows the anode and the cathode to be in close proximity to each other without being in contact with each other.

12. The method of claim 11, further including the steps of forming a heating element by intarsia knitting at least one of the first conductive yarn and the second conductive yarns into a linear resistor or by intarsia knitting an insulated conductive yarn into a sheet of fabric and connecting the heating element to the supercapacitor via a switch.

13. The method of claim 11, wherein the knitting the first conductive yarn and the second conductive yarn into the intarsia knitted pattern comprising the completed supercapacitor is performed by an automatic knitting machine based on an intarsia geometric pattern input by a user.

14. The method of claim 11, wherein the knitting the first conductive yarn and the second conductive yarn into the supercapacitor comprises knitting the supercapacitor and an antenna into a same piece of fabric.

15. A device comprising:

a conductive yarn knitted into an intarsia knitted pattern forming a completed supercapacitor having an anode and a cathode, wherein the intarsia knitted pattern comprises a plurality of loops knitted in a section of a fabric and arranging the conductive yarn in a design configured to function as the supercapacitor, wherein the intarsia knitted pattern is based on a resistance of the conductive yarn being calculated as a function of length of yarn in each knitted row of the intarsia knitted pattern; and an ionically permeable separator that allows the anode and the cathode to be in close proximity to each other without being in contact with each other.

16. The device of claim 15, wherein the anode and the cathode in the intarsia knitted pattern are sufficiently close to one another to store a charge sufficient to power an electrical component electrically coupled to the supercapacitor.

17. The device of claim 15, wherein at least a portion of the intarsia knitted pattern comprises at least a portion of the anode being knitted 4 rows or less of knitting apart from at least a portion of the cathode.

18. The device of claim 15, wherein the section of the fabric comprising the intarsia knitted pattern has a different knitting pattern than portions of the fabric outside of the section.

* * * * *